(12) United States Patent
Yang et al.

(10) Patent No.: US 11,721,345 B2
(45) Date of Patent: Aug. 8, 2023

(54) DEVICE, SYSTEM AND METHOD FOR CONTROLLING A PLURALITY OF VOICE RECOGNITION DEVICES

(71) Applicant: LG ELECTRONICS INC., Seoul (KR)

(72) Inventors: Siyoung Yang, Seoul (KR); Yongchul Park, Seoul (KR); Sungmin Han, Seoul (KR); Sangki Kim, Seoul (KR); Juyeong Jang, Seoul (KR); Minook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 215 days.

(21) Appl. No.: 16/917,784

(22) Filed: Jun. 30, 2020

(65) Prior Publication Data

US 2021/0233537 A1 Jul. 29, 2021

(30) Foreign Application Priority Data

Jan. 28, 2020 (KR) .......................... 10-2020-0009612

(51) Int. Cl.
| | |
|---|---|
| *G10L 15/32* | (2013.01) |
| *G10L 15/30* | (2013.01) |
| *G16Y 40/35* | (2020.01) |
| *G10L 15/22* | (2006.01) |

(52) U.S. Cl.
CPC .............. *G10L 15/32* (2013.01); *G10L 15/22* (2013.01); *G10L 15/30* (2013.01); *G16Y 40/35* (2020.01); *G10L 2015/228* (2013.01)

(58) Field of Classification Search
CPC ... G06F 3/167; G10L 15/22; G10L 2015/223; G10L 15/26; G10L 17/00; G10L 15/00; G10L 15/18
See application file for complete search history.

(56) References Cited

U.S. PATENT DOCUMENTS

| | | | |
|---|---|---|---|
| 10,490,195 B1* | 11/2019 | Krishnamoorthy | ..... G10L 17/22 |
| 2017/0357534 A1* | 12/2017 | Gupta | .................. G06F 9/5027 |
| 2018/0260680 A1* | 9/2018 | Finkelstein | .............. G06N 5/04 |
| 2019/0295542 A1* | 9/2019 | Huang | .................... G06F 3/167 |
| 2020/0043481 A1* | 2/2020 | Xiong | .................... H04L 65/75 |
| 2020/0193982 A1* | 6/2020 | Kim | ........................ G10L 15/30 |

* cited by examiner

*Primary Examiner* — Mark Villena
(74) *Attorney, Agent, or Firm* — Lee, Hong, Degerman, Kang & Waimey PC

(57) ABSTRACT

Disclosed is a device for controlling a plurality of voice recognition devices for determining and selecting a first voice recognition device that a user wants to use based on a point in time when the voice of the user is spoken or a place where the user spoke the voice. The device for controlling a plurality of voice recognition devices according to the present disclosure may be associated with an artificial intelligence module, a robot, an augmented reality (AR) device, a virtual reality (VR) device, a device related to 5G service, etc.

13 Claims, 17 Drawing Sheets

DEVICE, SYSTEM AND METHOD FOR CONTROLLING A PLURALITY OF VOICE RECOGNITION DEVICES

CROSS-REFERENCE TO RELATED APPLICATION

Pursuant to 35 U.S.C. § 119(a), this application claims the benefit of earlier filing date and right of priority to Korean Patent Application No. 10-2020-0009612, filed on Jan. 28, 2020, the contents of which are hereby incorporated by reference herein in its entirety.

BACKGROUND OF THE INVENTION

Field of the Invention

The present disclosure relates to a device, a system and a control method for controlling a plurality of voice recognition devices using an artificial intelligence learning function.

Description of the Related Art

As technology develops, various devices and services using voice recognition technology have been introduced in many fields recently. The voice recognition technology may be a series of processes that convert a human voice into a command that can be handled by a computer so that the device can understand it, and the voice recognition service using the voice recognition technology includes a series of processes in which the device recognizes a user's voice and provides a suitable service corresponding thereto.

Devices to which such voice recognition technology is applied may be referred to as a voice recognition device, and the voice recognition device may include a wide variety of types depending on the function. For example, the voice recognition device may include a TV, an air conditioner, an air cleaner, a refrigerator, a washing machine, a cleaning robot, and a personal computer (PC) including the voice recognition technology.

On the other hand, such various types of voice recognition devices may be set to recognize a specific starting word in order to recognize a user's voice and execute a function. That is, the user can call or operate a specific voice recognition device by uttering the specific starting word.

In the related art, these starting words are not set differently for various types of voice recognition devices. Rather, manufacturers of the voice recognition devices often set the same starting word for the various types of voice recognition devices in order to emphasize their brand to customers and users.

For example, referring to FIG. 1, when a manufacturer of a voice recognition device sets 'Hi LG' (T1) as a starting word for the voice recognition device, conventionally, when a first user u1 utters 'Hi LG' (T1), a plurality of voice recognition devices D1, D2, and D3 disposed in a certain area all simultaneously recognize 'Hi LG' (T1) as a starting word, and are operated, so that it was difficult to properly use a specific voice recognition device that the first user u1 wanted to use. FIG. 1 is a view showing a case in which a user utters a starting word in an area where a plurality of voice recognition devices are disposed in the related art. In addition, when different starting words are set for each of the voice recognition devices D1, D2, and D3, the first user u1 may also have difficulty in remembering and calling different start words for every device.

In addition, conventionally, as shown in FIG. 2, when the first user u1 utters the starting word or a command to operate the function of each device D1, D2, D3, D4, D5, D6, among devices D1, D2, D3, D4, D5, D6 in a certain area r1, the device that receives the voice of the first user u1 and shows the largest signal-to-noise ratio (SNR) is configured to respond to the voice of the first user u1. That is, as shown in FIG. 2, the device 1 D1 closest to the first user u1 may operate in response to the voice of the first user u1, but there was a problem that the device 1 D1 may not be a device that the first user u1 actually wants to use. FIG. 2 is a view showing a principle in which a voice recognition device responds to a user's voice in the related art.

As described above, when various voice recognition devices produced by the same manufacturer are disposed together in a certain space, it is difficult for them to determine whether a starting word uttered by the user is intended to start which voice recognition device among various voice recognition devices.

That is, when the user utters the starting word in order to start a specific voice recognition device among a plurality of voice recognition devices, there has been a case in which the plurality of voice recognition devices recognize the starting word together and are started. Accordingly, unnecessary power consumption has occurred as the voice recognition device that the user does not intend to use operates, and the probability of errors in voice recognition of individual voice recognition devices increases.

SUMMARY OF THE INVENTION

The present disclosure is intended to solve the above-described needs and/or problems.

A device, system and control method for controlling a plurality of voice recognition devices according to the present disclosure enable a voice recognition device that a user wants to use to accurately recognize and start a user's voice command when the user utters the voice command in a space where various voice recognition devices are disposed.

In addition, a device, system and control method for controlling a plurality of voice recognition devices according to the present disclosure can accurately distinguish a voice recognition device that a user wants to use when the user utters the voice command by analyzing a user's life pattern by artificial intelligence learning.

A device for controlling a plurality of voice recognition devices according to an embodiment of the present disclosure includes a user identification unit that identifies who a user is by using a voice spoken by the user, a user setting storage unit that stores a setting value of the user, a model storage unit that receives the voice from the user identification unit, analyzes intention of the user, and selects a first voice recognition device corresponding to the analyzed intention, a data learning unit that can change models stored in the model storage unit by artificial intelligence learning, and a processor that controls the first voice recognition device to execute a function corresponding to the voice or the intention, wherein the model storage unit selects the first voice recognition device based on a point in time when the voice is spoken from the user or a place where the user spoke the voice.

The model storage unit further may include an intention analysis model for analyzing the intention, and a device selection model for selecting the first voice recognition device, wherein the first voice recognition device may be a voice recognition device that the user wants to use among a plurality of voice recognition devices.

The intention analysis model may include a specific user intention analysis model for analyzing intention of a specific user, and a common user intention analysis model for analyzing individual intention of a common user that is another user in addition to the specific user, wherein the specific user may be a user whose setting value is stored in the user setting storage unit, and the common user may be a user whose setting value is not stored in the user setting storage unit.

The device selection model may include a specific device selection model for selecting the first voice recognition device among the plurality of voice recognition devices in response to the intention of the specific user, and a common device selection model for selecting a voice recognition device corresponding to the individual intention of the common user among the plurality of voice recognition devices, wherein the voice recognition device corresponding to the individual intention of the common user may include at least one of the first voice recognition device and a second voice recognition device that is a device different from the first voice recognition device.

The device selection model may further include a user feedback analysis unit that collects and analyzes a reaction of the user, wherein the user feedback analysis unit may compare the intention with the reaction of the user, and analyze whether the device that the user wants to use matches the first voice recognition device.

A system for controlling a plurality of voice recognition devices according to another embodiment of the present disclosure includes a plurality of voice recognition devices, a server networked with each of the plurality of voice recognition devices, and a user terminal that can perform data communication with the server and the voice recognition devices, wherein the server includes a user identification unit that identifies who a user is by using a voice spoken by the user, a user setting storage unit that stores a setting value of the user, a model storage unit that receives the voice from the user identification unit, analyzes intention of the user, and selects a first voice recognition device corresponding to the analyzed intention, a data learning unit that can change models stored in the model storage unit by artificial intelligence learning, and a processor that controls the first voice recognition device to execute a function corresponding to the voice or the intention, wherein the model storage unit selects the first voice recognition device based on a point in time when the voice is spoken from the user or a place where the user spoke the voice.

The plurality of voice recognition devices may include a TV, an air conditioner, an air cleaner, a refrigerator, a kimchi refrigerator, a water purifier, a dishwasher, a microwave, a washing machine, a dryer, a styler, a cleaning robot, a massage chair, a PC and a projector.

The model storage unit may further include an intention analysis model for analyzing the intention, and a device selection model for selecting the first voice recognition device, wherein the first voice recognition device may be a voice recognition device that the user wants to use among the plurality of voice recognition devices.

The intention analysis model may include a specific user intention analysis model for analyzing intention of a specific user, and a common user intention analysis model for analyzing individual intention of a common user that is another user in addition to the specific user, wherein the specific user may be a user whose setting value is stored in the user setting storage unit, and the common user may be a user whose setting value is not stored in the user setting storage unit.

The device selection model may include a specific device selection model for selecting the first voice recognition device among the plurality of voice recognition devices in response to the intention of the specific user, and a common device selection model for selecting a voice recognition device corresponding to the individual intention of the common user among the plurality of voice recognition devices, wherein the voice recognition device corresponding to the individual intention of the common user may include at least one of the first voice recognition device and a second voice recognition device that is a device different from the first voice recognition device.

The server may further include a user feedback analysis unit that collects and analyzes a reaction of the user, and wherein the user feedback analysis unit may compare the intention with the reaction of the user, and analyze whether the device that the user wants to use matches the first voice recognition device.

A method for controlling a plurality of voice recognition devices through a voice recognition system according to another embodiment of the present disclosure includes recognizing a voice of a user by the voice recognition devices, identifying who the user is through the voice, checking whether a setting value of the user is stored and determining whether to apply the setting value to selection for a first voice recognition device, selecting the first voice recognition device, performing a response to the user by the first voice recognition device, executing a function corresponding to the voice of the user by the first voice recognition device, and checking feedback of the user, wherein the first voice recognition device is a voice recognition device that the user wants to use.

The selecting the first voice recognition device may further include selecting the first voice recognition device among the plurality of voice recognition devices in response to the intention of the specific user, and selecting a voice recognition device corresponding to the individual intention of another user in addition to the specific user among the plurality of voice recognition devices.

The performing a response to the user by the first voice recognition device may further include performing a response corresponding to the intention of the specific user by the first voice recognition device, and performing a response corresponding to the individual intention by the voice recognition device corresponding to the individual intention of the common user.

The checking feedback of the user may further include identifying from which user the feedback generated, classifying feedback generated from the specific user, generating life pattern data of the specific user based on the feedback, analyzing the feedback and learning the intention of the specific user included in the feedback, determining whether the first voice recognition device corresponding to the intention of the specific user is selected, and updating an intention analysis model and a device selection model depending on the determining whether the first voice recognition device corresponding to the intention of the specific user is selected.

The device, system and control method for controlling a plurality of voice recognition devices according to the present disclosure analyze and determine a user's voice utterance time, place, and user's life pattern by themselves to determine the voice recognition device that the user wants to use, thus the user can use the voice recognition device the user wants to use with a simple command, and the user's UX environment is improved.

The device, system and control method for controlling a plurality of voice recognition devices according to the present disclosure analyze and determine a user's voice utterance time, place, and user's life pattern by themselves to determine the voice recognition device that the user wants to use, thus the voice recognition device may perform a function in advance by predicting the function desired by the user.

DETAILED DESCRIPTION OF THE EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 3:
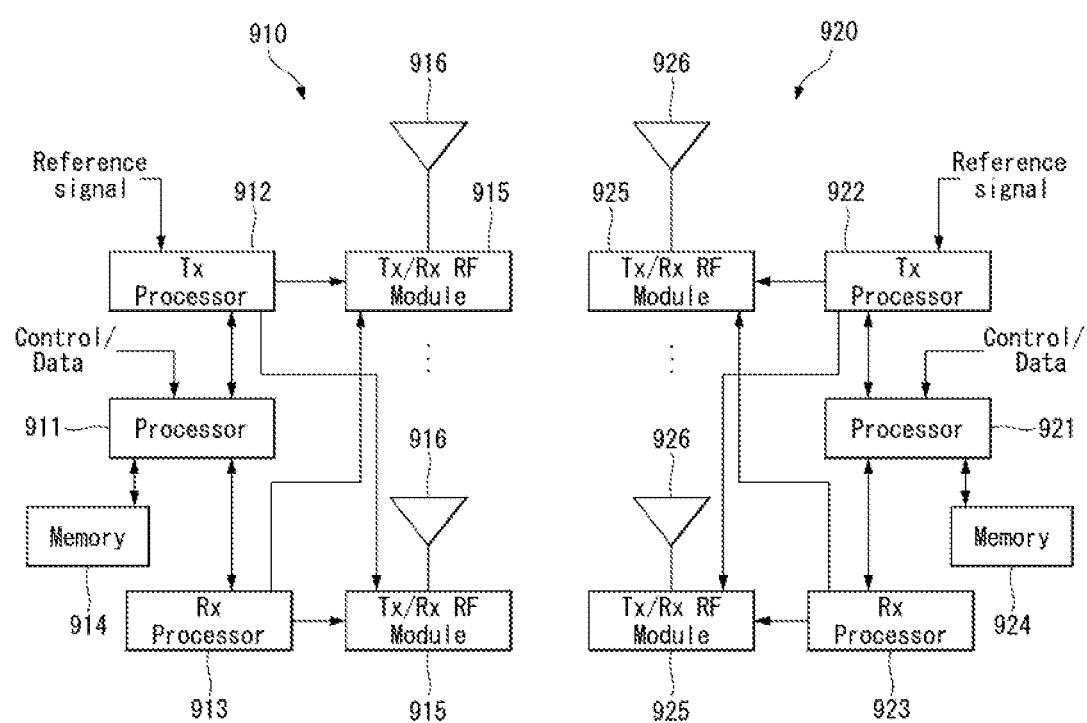
FIG. 3 is a block diagram of a wireless communication system to which methods proposed in the disclosure are applicable.

FIG. 3 is a block diagram of a wireless communication system to which methods proposed in the disclosure are applicable.

Referring to FIG. 3, a device (autonomous device) including an autonomous module is defined as a first communication device (910 of FIG. 3), and a processor 911 can perform detailed autonomous operations.

A 5G network including another vehicle communicating with the autonomous device is defined as a second communication device (920 of FIG. 3), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a FinTech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 3, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer). UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

According to an embodiment of the present invention, the first communication device may be a vehicle, and the second communication device may be a 5G network.

B. Signal Transmission/Reception Method in Wireless Communication System

Figure 4:
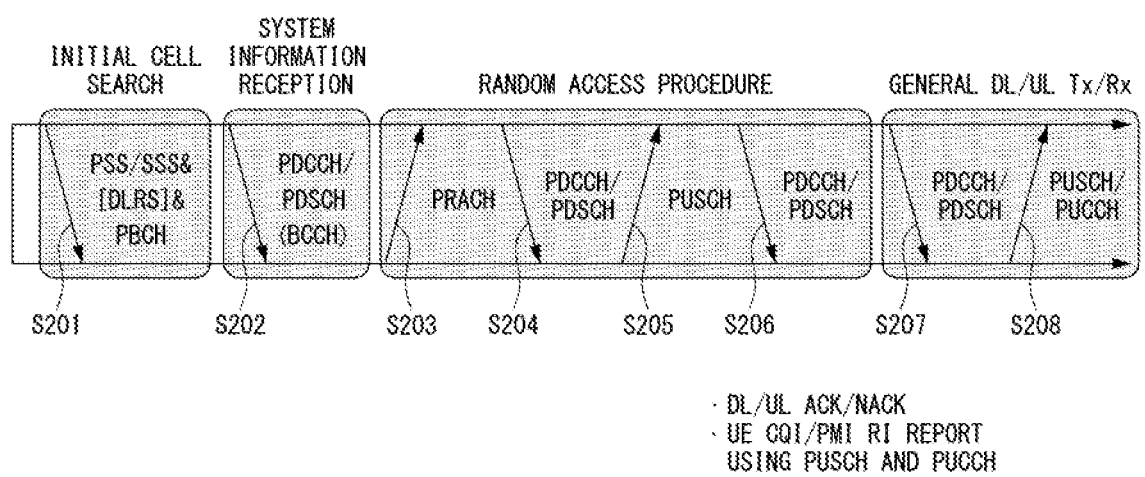
FIG. 4 shows an example of a signal transmission/reception method in a wireless communication system.

FIG. 4 is a diagram showing an example of a signal transmission/reception method in a wireless communication system.

Referring to FIG. 4, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 4.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 4.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 3 and 4.

First, a basic procedure of an applied operation to which a method proposed by the present invention which will be described later and eMBB of 5G communication are applied will be described.

Figure 5:
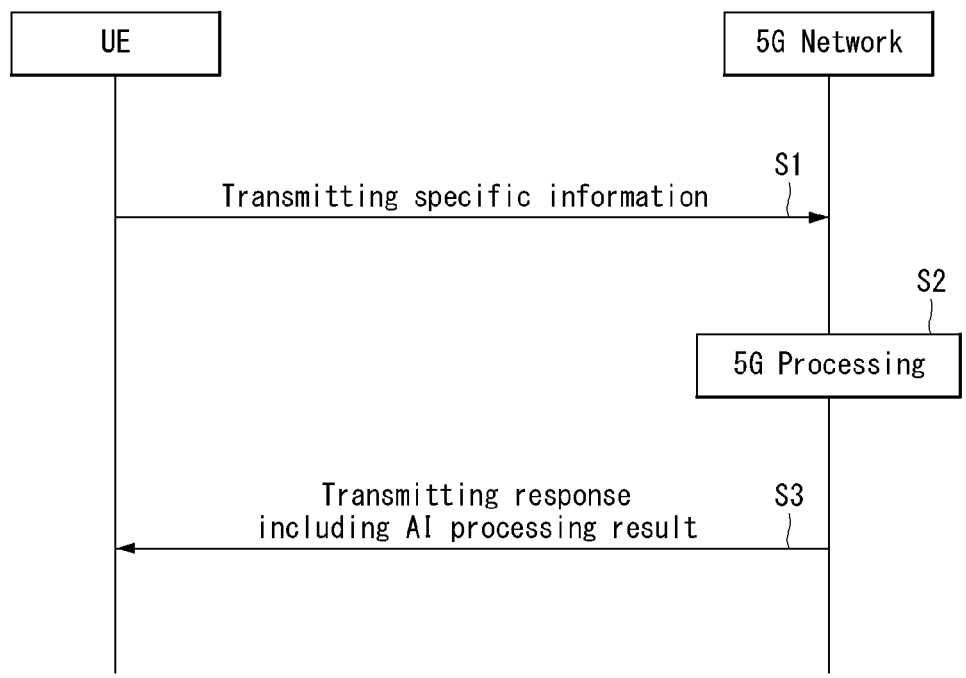
FIG. 5 shows an example of basic operations of a user equipment and a 5G network in a 5G communication system.

As in steps S1 and S3 of FIG. 5, the autonomous vehicle performs an initial access procedure and a random access procedure with the 5G network prior to step S1 of FIG. 5 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information.

Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 5 which are changed according to application of mMTC.

In step S1 of FIG. 5, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

FIG. 4 is a diagram showing a vehicle according to an embodiment of the present invention.

Referring to FIG. 4, a vehicle 10 according to an embodiment of the present invention is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle.

The vehicle 10 may be a shared vehicle. The vehicle 10 may be an autonomous vehicle.

H. Block Diagram of AI Device

Figure 6:
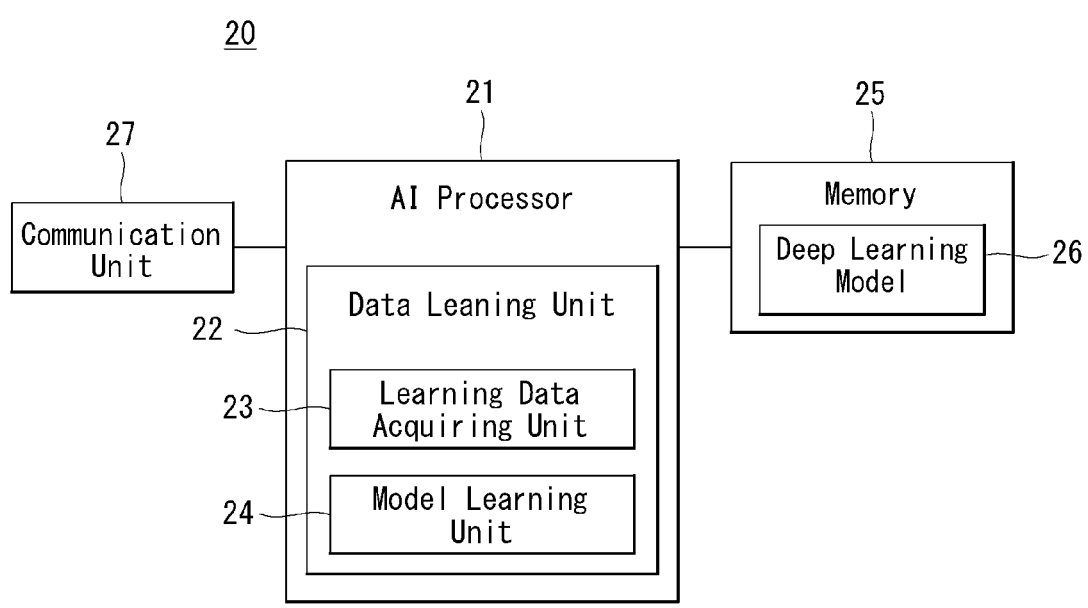
FIG. 6 is a block diagram of an AI device according to an embodiment of the present invention.

FIG. 6 is a block diagram of an AI device according to an embodiment of the present invention.

Figure 1:
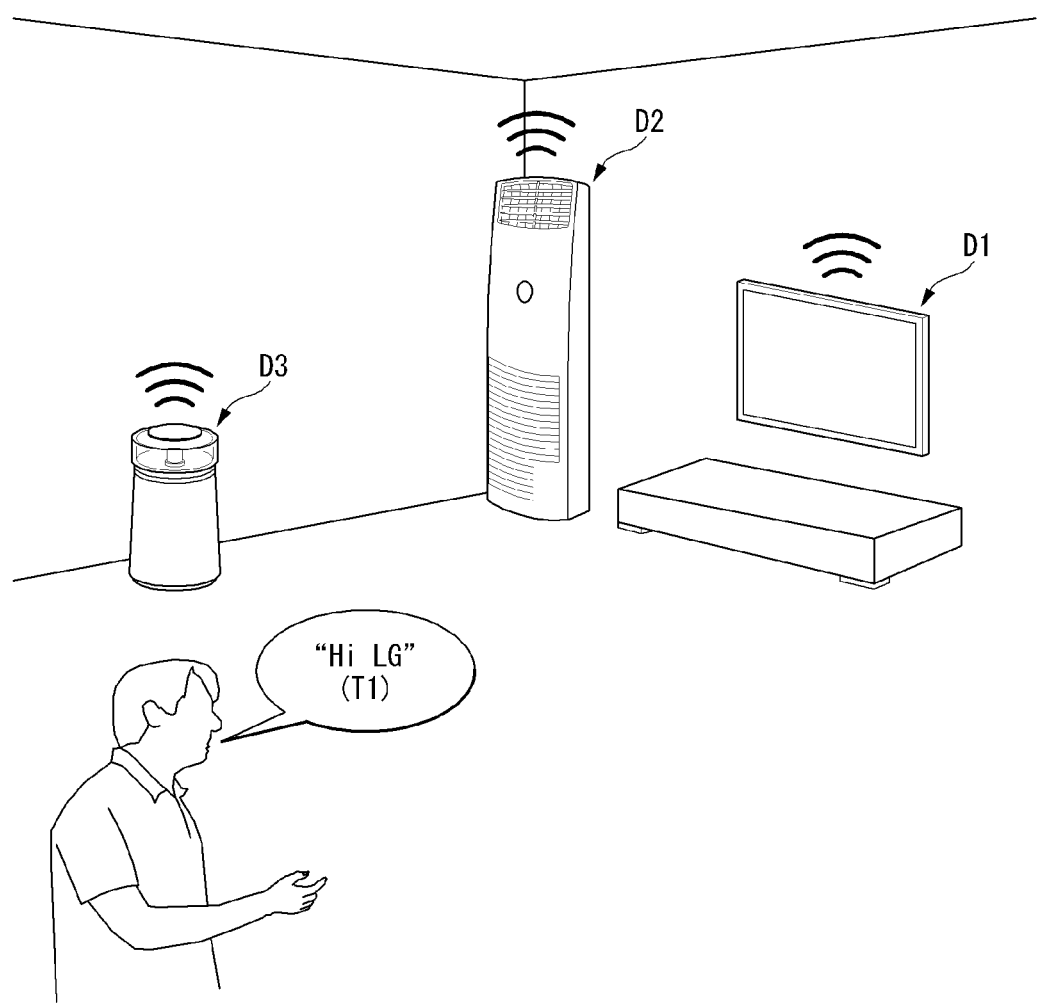
FIG. 1 is a view showing a case in which a user utters a starting word in an area where a plurality of voice recognition devices are disposed in the related art.
Figure 2:
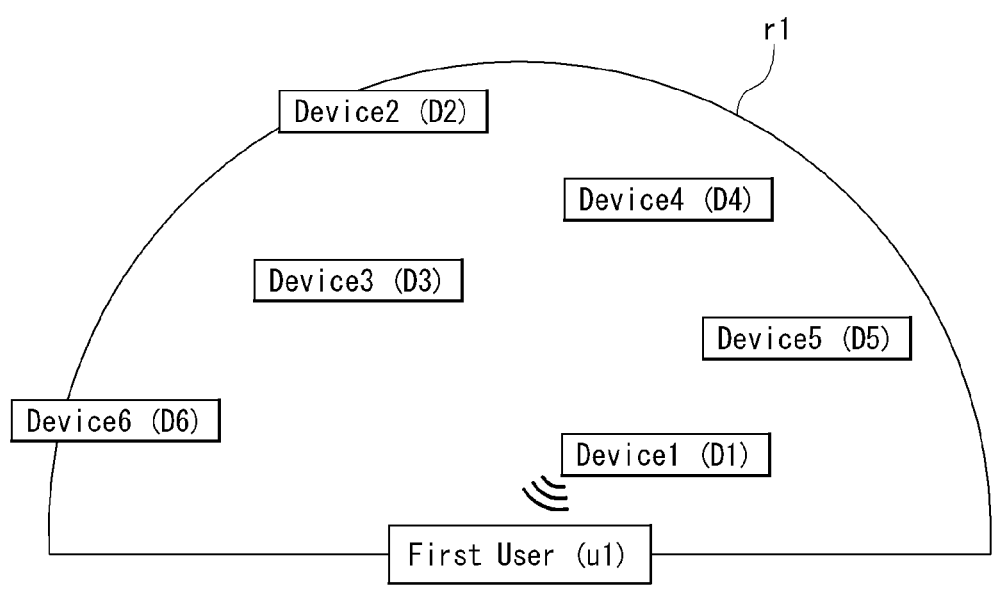
FIG. 2 is a view showing a principle in which a voice recognition device responds to a user's voice in the related art.

An AI device 20 may include an electronic device including an AI module that can perform AI processing, a server including the AI module, or the like. Further, the AI device 20 may be included as at least one component of the vehicle 10 shown in FIG. 1 to perform together at least a portion of the AI processing.

The AI processing may include all operations related to driving of the vehicle 10 shown in FIG. 4. For example, an autonomous vehicle can perform operations of processing/determining, and control signal generating by performing AI processing on sensing data or driver data. Further, for example, an autonomous vehicle can perform autonomous driving control by performing AI processing on data acquired through interaction with other electronic devices included in the vehicle.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 6 was functionally separately described into the AI processor 21, the memory 25, the communication unit 27, etc., but it should be noted that the aforementioned components may be integrated in one module and referred to as an AI module.

Figure 7:
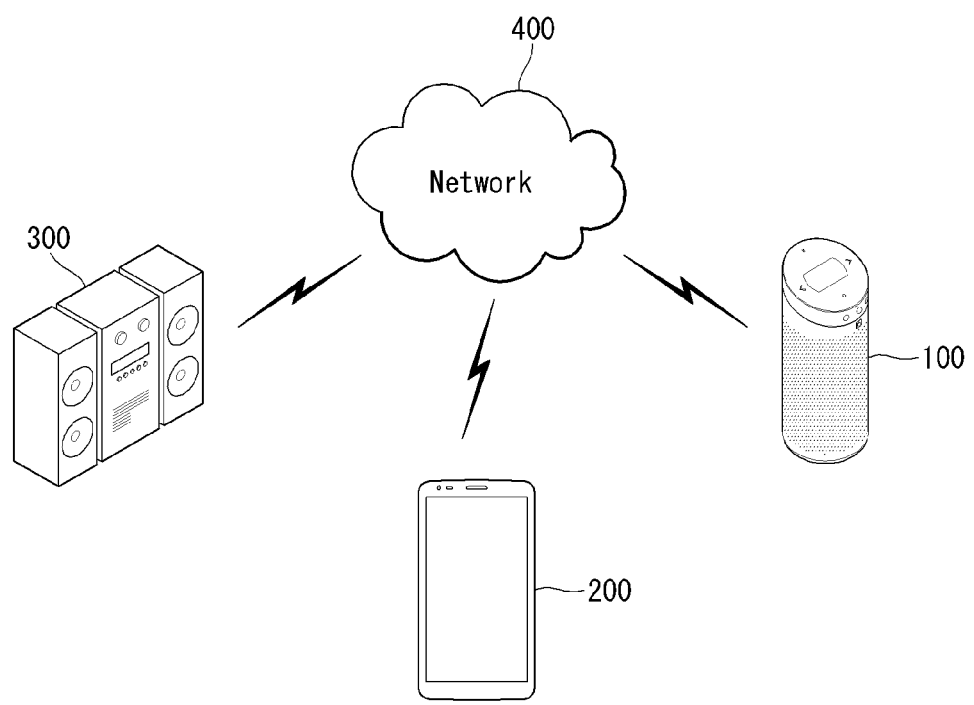
FIG. 7 is a diagram showing a voice recognition system according to the present disclosure.

Referring to FIG. 7, a voice recognition system according to an embodiment of the present disclosure includes a voice recognition device 100, a user terminal 200, a server 300 and a network connecting them to each other. Such a network may be configured to correspond to the 5G communication standard described above. Here, FIG. 7 is a diagram showing a voice recognition system according to an embodiment of the present disclosure.

On the other hand, in addition to the devices shown in FIG. 7 various other electronic devices used in a home or office may operate in connection with each other under the Internet of Things.

The voice recognition device 100 may receive a user's utterance and provide a voice recognition service through recognition and analysis. In the present embodiment, the voice recognition device 100 may include various electronic devices capable of performing voice recognition functions such as an artificial intelligence (AI) speaker or a communication robot. In addition, the voice recognition device 100 may serve as a hub for controlling electronic devices without a voice input/output function.

On the other hand, the voice recognition service may include receiving a user's utterance and distinguishing starting words from the utterance, and outputting a result of processing a voice recognizer for the utterance to be recognized by the user.

The utterance means the smallest unit of communication in discourse-text linguistics. The starting word is a specific command for activating the voice recognition function of the voice recognition device 100, and may be referred to as a wake-up word. The voice recognition function may be activated only when the staring word is included in the utterance, and the voice recognition function remains inactive (e.g. sleep mode) when the staring word is not included in the utterance. These starting words may be set in advance and stored in a memory 160 embedded in the voice recognition device 100.

In addition, after the voice recognition function of the voice recognition device 100 is activated by the starting word, the utterance uttered from the user may consist as voice commands that the voice recognition device 100 may substantially process and generate output.

For example, when the entire utterance of the user is "Hi LG, turn on the air conditioner", the starting word may be configured as "Hi LG", and a voice command may be configured as "Turn on the air conditioner". In this case, the voice recognition device 100 receives and analyzes the user's utterance to determine the existence of the starting word, and executes the utterance to control the air conditioner (not shown) as an electronic device.

In the present embodiment, the voice recognition device 100 determines a temporary pause for reception of a first utterance during the reception of the first utterance in a state in which the voice recognition function is activated after receiving the starting word. In addition, the voice recognition device 100 outputs a voice recognition processing result of a second utterance received after the temporary pause, separately from the first utterance, determines a third utterance received after outputting the voice recognition result of the second utterance as an extension of the first utterance, and determines intention of the third utterance. Thereafter, when combining the first and third utterances, the voice recognition device 100 combines a word or information that are identically expressed in the first and third utterances so as not to overlap, and generates a user voice command based on this. In addition, the voice recognition device 100 may output the result by performing the voice recognition processing based on the user voice command.

Here, the first utterance may include a first voice command that is uttered after the user utters the starting word, and the first utterance may include an incomplete utterance. In addition, the second utterance may include a second voice command that is uttered after the pause of the first utterance is determined, and the second utterance may include a completed utterance. The third utterance may include a third voice command uttered by the user after outputting the voice recognition processing result of the second utterance, which is the voice command that is an extension of the first utterance, and may also include an incomplete utterance. The user voice command grasps intentions of the incomplete first utterance and the incomplete third utterance and includes a completed utterance combining the first and third utterances.

In the present embodiment, the complete utterance includes a voice command capable of outputting the voice recognition processing result. In addition, the incomplete utterance includes a voice command that cannot output the voice recognition processing result.

In the present embodiment, when the voice recognition function is activated by receiving the starting word from the user, the voice recognition device 100 converts a voice command received from the user, that is, the utterance, into a text using an acoustic model (not shown) and a language model (not shown) stored therein.

The voice recognition device 100 grasps the intention of the utterance by performing syntactic analysis or semantic analysis on the converted text, after converting it into a text in natural language utterance form, and converts the text in natural language utterance form into voice information and outputs the voice recognition processing result.

In addition, the voice recognition device 100 may transmit the utterance to the server 300 and receive and output the voice recognition processing result from the server 300, in addition to the method of self-voice recognition processing as described above.

The user terminal 200 may be provided with a service capable of monitoring status information of the voice recognition device 100, driving or controlling the voice recognition device 100 through an authentication process after accessing a voice recognition driving application or a voice recognition driving site. The user terminal 200 that has completed the authentication process in the present embodiment, for example, when receiving the user voice command, may determine an operation mode of the voice recognition device 100 to operate the voice recognition device 100, or control the operation of the voice recognition device 100.

The user terminal 200 may include a communication terminal capable of performing a function of a computing device (not shown), and the user terminal 200 in the present embodiment may be a desktop computer, a smartphone, a laptop, a tablet PC, a smart TV, a mobile phone, a personal digital assistant (PDA), a laptop, a media player, a micro server, a global positioning system (GPS) device, an e-book terminal, a digital broadcasting terminal, a navigation, a kiosk, an MP3 player, a digital camera, a home appliance, and other mobile or non-mobile computing devices, which are operated by a user, but is not limited thereto.

In addition, the user terminal 200 may be a wearable terminal such as a watch, glasses, a hair band, and a ring equipped with a communication function and a data processing function. The user terminal 200 is not limited to the above, and any terminal capable of web browsing may be included in the user terminal 200.

The server 300 may be a database server that provides big data necessary to apply various artificial intelligence algorithms and data related to voice recognition. In addition, the server 300 may include a web server or an application server that allows the voice recognition device 100 to be remotely controlled using an application or a web browser installed on the user terminal 200.

When the voice recognition device 100 receives the starting word and activates the voice recognition function, and then transmits the utterance to the server 300 without processing the received utterance by itself, the server 300 determines whether a temporary pause has occurred in the first utterance from the voice recognition device 100.

If the server 300 determines that the temporary pause has occurred in the first utterance, the server 300 receives the second utterance from the voice recognition device after the temporary pause, generates a voice recognition processing result for the second utterance, and transmits the result to the voice recognition device 100. The voice recognition device 100 outputs the voice recognition processing result of the second utterance, and transmits the third utterance received from the user to the server 300. The server 300 determines the third utterance as an extension of the first utterance, and generates a voice recognition processing result for a fourth utterance combining the first utterance and the third utterance, and transmits the result to the voice recognition device 100. In addition, the voice recognition device 100 outputs the voice recognition processing result for the fourth utterance.

The network 400 may serve to connect the voice recognition device 100 and the user terminal 200. The network 400 may include, for example, a wired network such as Local Area Networks (LANs), Wide Area Networks (WANs), Metropolitan Area Networks (MANs), and Integrated Service Digital Networks (ISDNs), or a wireless network such as wireless LANs, CDMA, Bluetooth, and satellite communications, but the scope of the present disclosure is not limited thereto.

In addition, the network 400 may transmit and receive information using short-range communication and/or long-distance communication. Here, the short-range communication may include Bluetooth, radio frequency identification (RFID), infrared data association (IrDA), ultra-wideband (UWB), ZigBee, and wireless fidelity (Wi-Fi) technology, and the long-distance communication may include code division multiple access (CDMA), frequency division multiple access (FDMA), time division multiple access (TDMA), orthogonal frequency division multiple access (OFDMA), and single carrier frequency division multiple access (SC-FDMA) technology.

The network 400 may include connections of network elements such as hubs, bridges, routers, switches and gateways. The network 400 may include one or more connected networks, including a public network such as the Internet and a private network such as a secure corporate private network, such as a multiple network environment. Access to network 400 may be provided through one or more wired or wireless access networks. Furthermore, the network 400 may support an Internet of Things (IoT) network that exchanges and processes information between distributed components such as objects and/or 5G communication.

On the other hand, the voice recognition device 100 according to the present disclosure illustrated in FIG. 7 is illustrated as a set top box, but is not limited thereto. That is, if the voice recognition device 100 according to the present disclosure has a voice recognition function, it may be configured as a TV, an air conditioner, an air cleaner, a refrigerator, a kimchi refrigerator, a water purifier, a dishwasher, a microwave, a washing machine, a dryer, a styler, a cleaning robot, a massage chair, a PC and a projector. Accordingly, in the present disclosure, the plurality of voice recognition devices 100 or the multiple voice recognition devices 100 includes all the above-described TV, air conditioner, air cleaner, refrigerator, kimchi refrigerator, water purifier, dishwasher, microwave oven, washing machine, dryer, styler, cleaning robot, massage chair, PC and projector.

Figure 8:
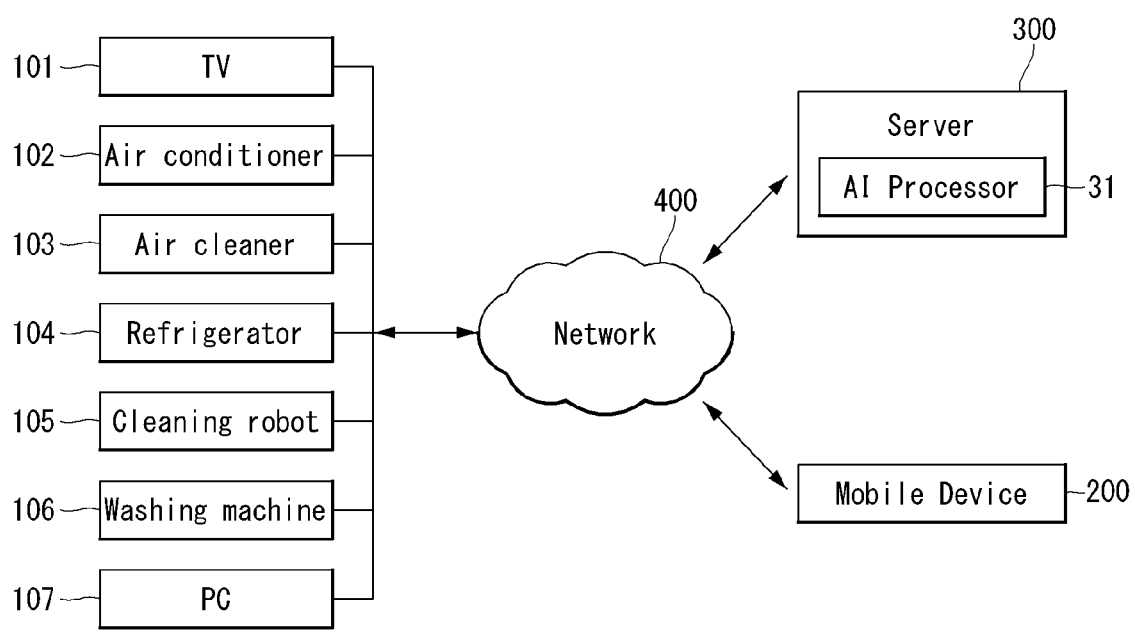
FIG. 8 is a diagram showing that a voice recognition system according to the present disclosure includes various voice recognition devices.

Referring to FIG. 8, the TV 101, the air conditioner 102, the air cleaner 103, the refrigerator 104, the cleaning robot 105, the washing machine 106, and the PC 107, which are included in the plurality of voice recognition devices 100, are connected to the server 300 and the user's mobile device 200 through the network 400, respectively.

Hereinafter, a system for controlling a plurality of voice recognition devices according to an embodiment of the present disclosure will be described with reference to FIGS. 8 and 9.

Figure 9:
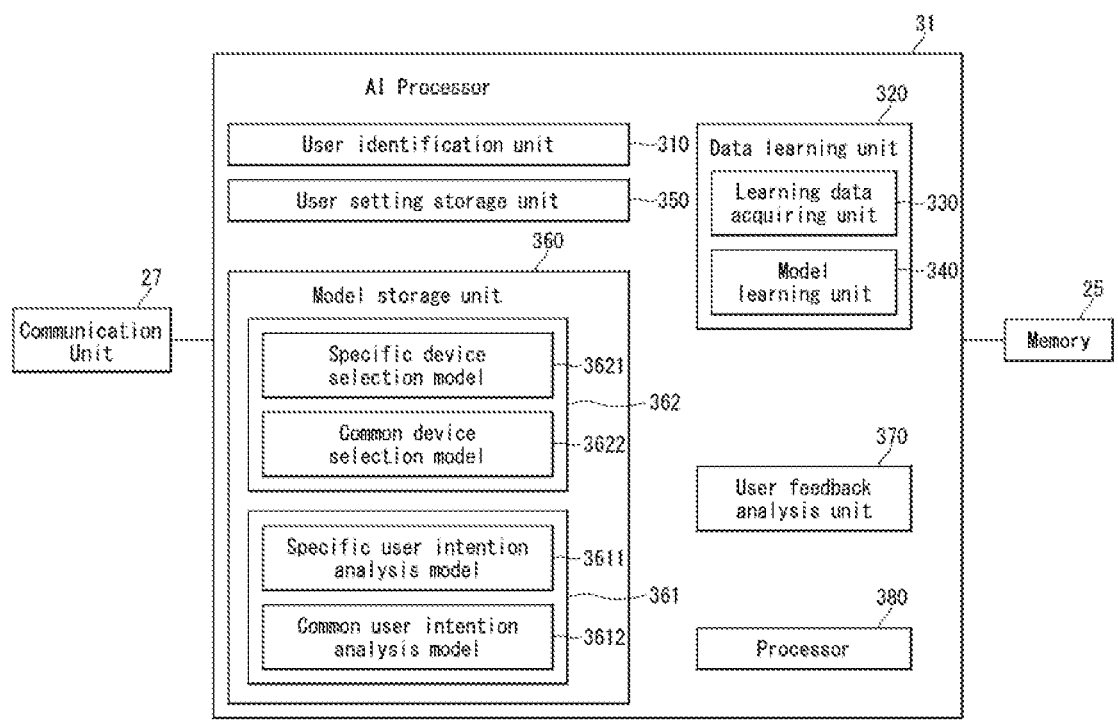
FIG. 9 is a block diagram of an AI device according to another embodiment of the present disclosure.

FIG. 8 is a diagram showing that a voice recognition system according to the present disclosure includes various voice recognition devices, and FIG. 9 is a block diagram of an AI device according to another embodiment of the present disclosure.

The TV 101, the air conditioner 102, the air cleaner 103, the refrigerator 104, the cleaning robot 105, the washing machine 106, and the PC 107, shown in FIG. 8, respectively recognize the user's voice, when the voice recognized through the network 400 is transmitted to the server 300, the server 300 may analyze the recognized voice, select a voice recognition device to operate in response to the user's voice, build a user's life pattern by performing artificial intelligence learning on the result of analyzing the user's voice.

The network 400 shown here may be configured to correspond to the above-mentioned 5G communication standard. On the other hand, in addition to the devices illustrated in FIG. 8, various other electronic devices used in a home or office may operate in connection with each other under the Internet of Things.

The voice recognition system illustrated in FIG. 8 has the same configuration as the voice recognition system illustrated in FIG. 7. In addition, it is shown in FIG. 8 that the voice recognition device 100 illustrated in FIG. 7 is implemented as what kind of voice recognition devices in reality. Therefore, the description of FIG. 8 may refer to the description of FIG. 7.

On the other hand, the server 300 illustrated in FIG. 8 may include an AI device or an AI processor as a processing device for analyzing a user's voice and building the user's life pattern. The AI device may be implemented as an AI processor 31 or as an independent device including the AI processor 31. In addition, the AI device may be configured as an AI module including the AI processor 31, a communication unit, and a memory.

In addition, the AI device may include an electronic device including the AI module capable of performing the AI processing or a server including the AI module. Therefore, in the present embodiment, the AI device may be configured as the server 300. In addition, the AI device may be configured to perform AI processing by being included as at least a part of the server 300 shown in FIG. 7.

Hereinafter, for convenience of explanation, it is described as an example that in the voice recognition system illustrated in FIG. 8, the AI device is configured as the server 300, and the server 300 includes the AI processor 31 to perform AI processing.

In addition, referring to FIG. 9, the AI device configured as the server 300 includes the memory 25 and/or the communication unit 27 as shown in FIG. 6, and includes an AI processor 31 similar to the AI processor 21 shown in FIG. 6.

Then, the server 300 analyzes the user's voice recognized through the TV 101, the air conditioner 102, the air cleaner 103, the refrigerator 104, the cleaning robot 105, the washing machine 106, and the PC 107 using the AI processor 31, and identifies who the user is.

Here, identifying who the user is means identifying which user or person corresponds to a user or a person who utters a voice among a plurality of users or a plurality of people.

For example, it is assumed that a first to fourth users reside in a home in which various voice recognition devices are disposed. When someone utters a voice in the corresponding home, the voice recognition system shown in FIG. 8 determines which of the first to fourth users is a person who utters the voice using the AI processor 31 or whether the person who utters the voice using the AI processor 31 corresponds to another person who is not registered as a user.

To this end, the AI processor 31 shown in FIG. 8 includes a user identification unit 310.

The AI processor 31 included in the server 300 will be described in more detail with reference to FIG. 9. Referring to FIG. 9, the AI processor 31 includes a user identification unit 310, a user setting storage unit 350, a model storage unit 360, a data learning unit 320, a user feedback analysis unit 370, and a processor 380.

The user identification unit 310 identifies who the user uttered the voice using the voice uttered by the user. Here, identifying the user by the voice is the same as described above. Accordingly, the user identification unit 310 identifies the user by checking whether the user who has uttered the voice corresponds to a user previously stored in the voice recognition system.

The user setting storage unit 350 stores setting values of the user. Here, the setting value includes name, language, age, gender, life pattern, taste, and voice characteristics of the individual user. In addition, the setting value may include various characteristics.

For example, when the first to fourth users live in a home where voice recognition devices are disposed, it may be assumed that the second user is a 12-year-old girl. In this case, the second user may have a life pattern of watching "Ding Dong Daeng Kindergarten" broadcasting on the EBS channel through the TV 101 having a voice recognition function at 4.30 p.m. every day except the weekend. The user setting storage unit 350 may store the life pattern of the second user in advance, and when the second user utters the voice to operate the TV 101, may apply to the operation of the TV 101 using the life pattern of the second user stored in advance as a set value.

The model storage unit 360 analyzes intention of the user by receiving the voice uttered by the user from the user identification unit 310. In addition, the model storage unit 360 selects a voice recognition device that the user wants to use based on the result of analyzing the intention of the user. Here, the voice recognition device to be used by a user whose setting value is stored in the user setting storage unit 350 may be referred to as a first voice recognition device.

In particular, the model storage unit 360 grasps which voice recognition device the user wants to use by recognizing and analyzing a point in time when the voice is uttered from the user or a place where the user uttered the voice, and selects a voice recognition device to be used by the user in consideration of the life pattern and usage pattern of the user by grasping a voice recognition device that the user wants to use at a specific time in a specific place.

On the other hand, the model storage unit 360 further includes an intention analysis model 362 for analyzing the intention of the voice spoken or uttered by the user, that is, the intention of the user, and a device selection model 361 for selecting the first voice recognition device based on the analyzed intention of the user.

As shown in FIG. 9, the intention analysis model 362 may include a specific user intention analysis model 3611 for analyzing intention of a specific user and a common user intention analysis model 3612 for analyzing individual intentions of other users other than the specific user. Here, a user whose setting value is stored in the user setting storage unit 350 may be referred to as the specific user, and a user whose setting value is not stored in the user setting storage unit 350 may be referred to as other user or a common user. Therefore, the other user or the common user in the present disclosure is different concepts from the specific user.

The device selection model 361, as shown in FIG. 9, includes a specific device selection model 3621 and a common device selection model 3622.

Here, the specific device selection model 361 selects the first voice recognition device that the specific user wants to use in response to the intention of the specific user. At this time, the specific device selection model 3621 grasps the life pattern and the device usage pattern of the user using the user's setting value stored in the user setting storage unit 350, and selects the first speech recognition device that the specific user wants to use based on this.

Therefore, when the user whose setting value is stored in the user setting storage unit 350 utters a voice, the voice recognition system according to the present embodiment may grasp a specific user's life pattern or device usage pattern based on the setting value using the user setting storage unit 350 and the specific device selection model 3621, and may quickly and accurately select the first voice recognition device, which is a voice recognition device that the specific user wants to use, among a plurality of voice recognition devices 101, 102, 103, 104, 105, and 106 based on the grasped results.

On the other hand, the common device selection model 3622 selects a voice recognition device corresponding to individual intentions of the common user among the plurality of voice recognition devices 101, 102, 103, 104, 105, and 106. In this case, the voice recognition device that the common user wants to use may be the same as the first voice recognition device that the specific user wants to use, but may be a device different from the first voice recognition device. Accordingly, when selecting a voice recognition device that the common user wants to use among the plurality of voice recognition devices 101, 102, 103, 104, 105, and 106, the common device selection model 3622 may not consider whether the corresponding voice recognition device is the first voice recognition device. Also, in this case, a voice recognition device different from the first voice recognition device may be referred to as a second voice recognition device.

For example, when the first voice recognition device that the specific user wants to use is the TV 101, the second voice recognition device may be any one of the voice recognition devices 102, 103, 104, 105, and 106 other than the TV 101.

On the other hand, the data learning unit 320 is configured in the same manner as the data learning unit 22 described with reference to FIG. 6. Accordingly, the data learning unit 320 illustrated in FIG. 9 may learn criteria on which learning data to use to determine data classification/recognition, and how to classify and recognize data using the learning data. In addition, the data learning unit 320 may learn a deep learning model by acquiring learning data to be used for learning and applying the acquired learning data to the deep learning model.

To this end, the data learning unit 320 further includes a learning data acquiring unit 330 and a model learning unit 340. The learning data acquiring unit 330 may acquire learning data necessary for a neural network model for classifying and recognizing data, and the model learning unit 340 may learn the neural network model to have a criterion for determining how to classify predetermined data using the acquired learning data. In addition, the data learning unit 320 may change the structure of the model by performing artificial intelligence learning on the models stored in the model storage unit 360.

The processor 380 controls the voice recognition device selected by the device selection model 362 to execute a function corresponding to the user's voice or a user's command or intention. The control unit 380 controls the first voice recognition device to execute a function according to a specific user's voice command or intention, and controls the first voice recognition device or the second voice recognition device to execute a function according to a common user's voice command or intention.

On the other hand, the AI processor 31 illustrated in FIG. 9 may be connected to the memory 25 and the communication unit 27 to be integrated into an AI module that is one module. The AI module is mounted on the server 300 shown in FIGS. 7 and 8 in a module form to perform AI processing function through the AI processor 31.

In addition, the server 300 includes the AI processor 31, the voice recognition system according to the present disclosure may identify a user by analyzing the user's voice by processing of the AI processor 31 included in the server 300, and control the operation of various voice recognition devices according to the life pattern of the user. However, it is not necessary to be configured as such an embodiment, and may be configured as a control device including the AI processor 31. The control device identifies the user by analyzing the user's voice by the AI processor 31, may be configured as a device that controls the operation of various voice recognition devices according to the life pattern of the user, and may be configured to perform a somewhat different function from the server.

Figure 10:
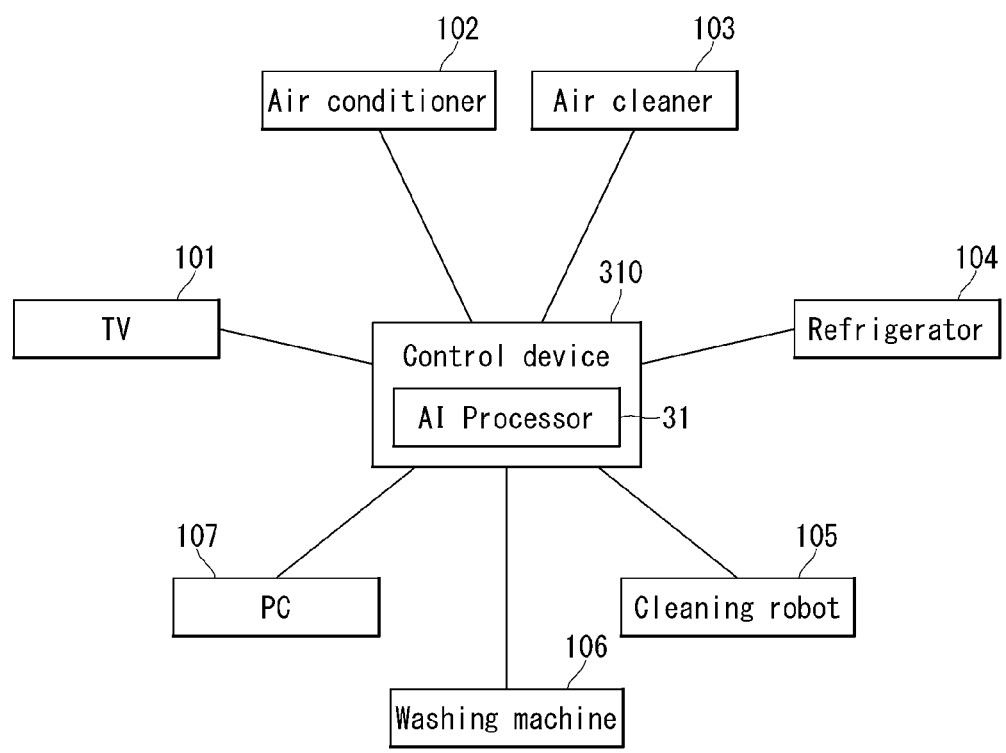
FIG. 10 is a diagram showing a control device 310 for controlling a plurality of voice recognition devices according to another embodiment of the present disclosure.

Referring to FIG. 10, as described above, a control device 310 controlling a plurality of voice recognition devices according to another embodiment of the present disclosure includes the AI processor 31, through artificial intelligence processing, and it can be seen that the voice recognition system according to another embodiment of the present disclosure is configured to perform the same function as that of the server 300. FIG. 10 is a diagram showing a control device 310 for controlling a plurality of voice recognition devices according to another embodiment of the present disclosure.

As shown in FIG. 10, the control device 310 may be configured differently from the server 300 according to another embodiment described above, but still includes the AI processor 31 and performs the AI processing function. In addition, since the AI processor 31 included in the control device 310 is configured in the same manner as the AI processor 31 included in the server 300, the control device 310 may analyze the user's voice through the AI processor 31 to identify the user, and control the operation of each voice recognition device 101, 102, 103, 104, 105, 106 according to the life pattern of the user. Therefore, the AI processor 31 illustrated in FIG. 10 may be configured in the same manner as the AI processor 31 illustrated in FIG. 9. In addition, the AI processor 31 illustrated in FIG. 10 may be connected to the memory 25 and the communication unit 27 to be integrated into an AI module that is one module. Therefore, the control device 310 illustrated in FIG. 10 may perform the same function as the server 300 illustrated in FIG. 8.

On the other hand, the control device 310 shown in FIG. 10 may be configured to control each voice recognition device 101, 102, 103, 104, 105, and 106 independently consisting of one device or terminal, however, the present disclosure is not limited thereto, and may be modularized to be embedded in each voice recognition device 101, 102, 103, 104, 105, and 106. In this case, the control device 310 shown in FIG. 10 is configured as a control module and may be embedded in each of the voice recognition devices 101, 102, 103, 104, 105, and 106.

Figure 11:
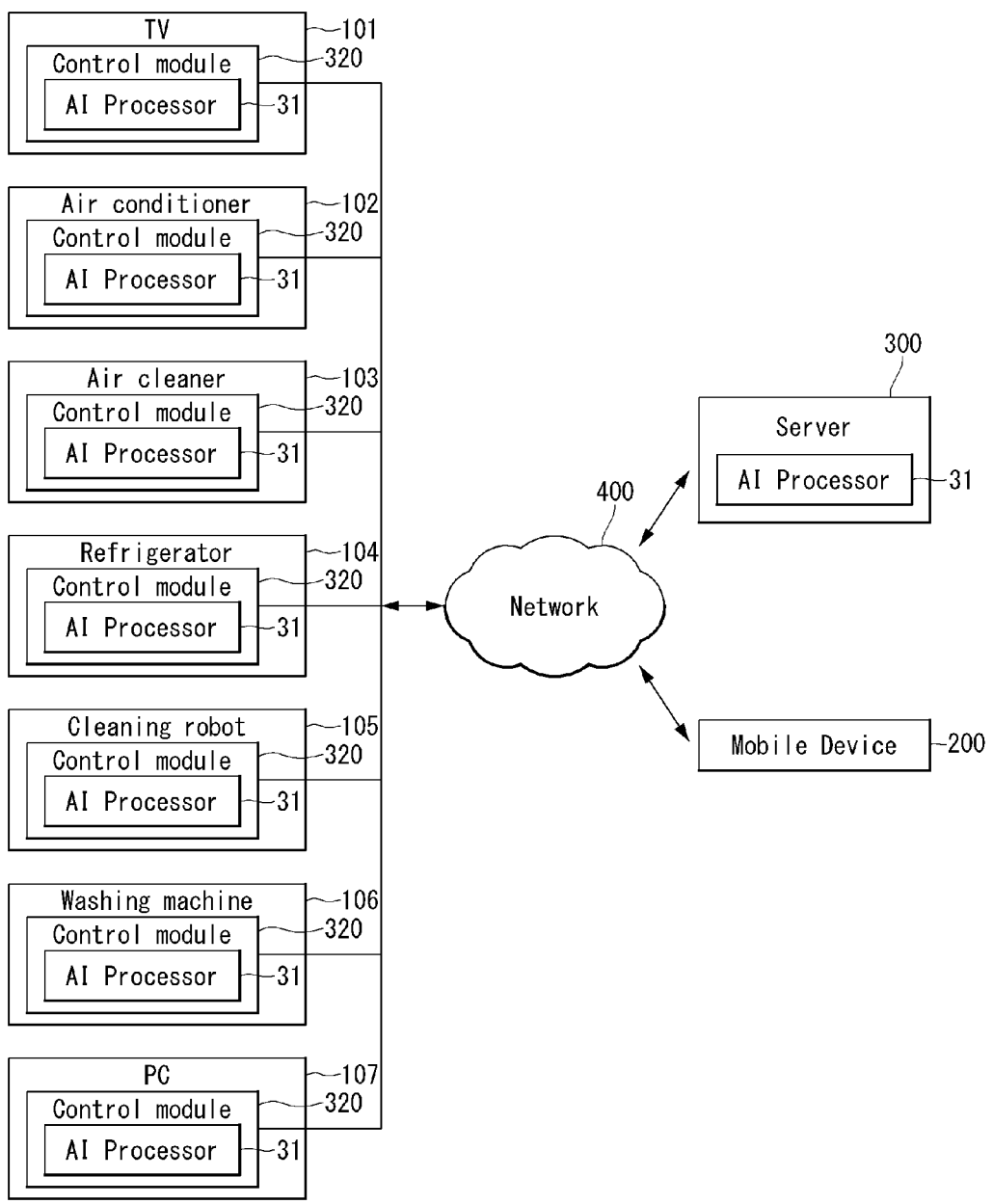
FIG. 11 is a diagram showing a control module 320 for controlling a plurality of voice recognition devices according to another embodiment of the present disclosure.

Referring to FIG. 11, an embodiment in which the control device 310 illustrated in FIG. 10 is configured as a control module will be described. FIG. 11 is a diagram showing a control module 320 for controlling a plurality of voice recognition devices according to another embodiment of the present disclosure.

Referring to FIG. 11, each of the voice recognition devices 101, 102, 103, 104, 105, and 106 includes the control module 320. Each control module 320 includes an AI processor 31. The AI processor 31 shown here is the same AI processor 31 as the AI processor 31 shown in FIG. 9. Accordingly, each control module 320 may identify the user by analyzing the user's voice inside the voice recognition device, and control the operation of the corresponding voice recognition devices 101, 102, 103, 104, 105, 106 according to the life pattern of the user.

However, hereinafter, for convenience of description, it will be described as an example that a voice recognition system according to another embodiment of the present disclosure controls a plurality of voice recognition devices.

In addition, with reference to FIGS. 12 to 15, it will be described scenarios that the voice recognition system according to another embodiment of the present disclosure recognizes the user's voice and controls the operation of each device.

FIGS. 12 to 15 are diagrams showing various scenarios that a voice recognition system according to another embodiment of the present disclosure controls a plurality of voice recognition devices.

Figure 12:
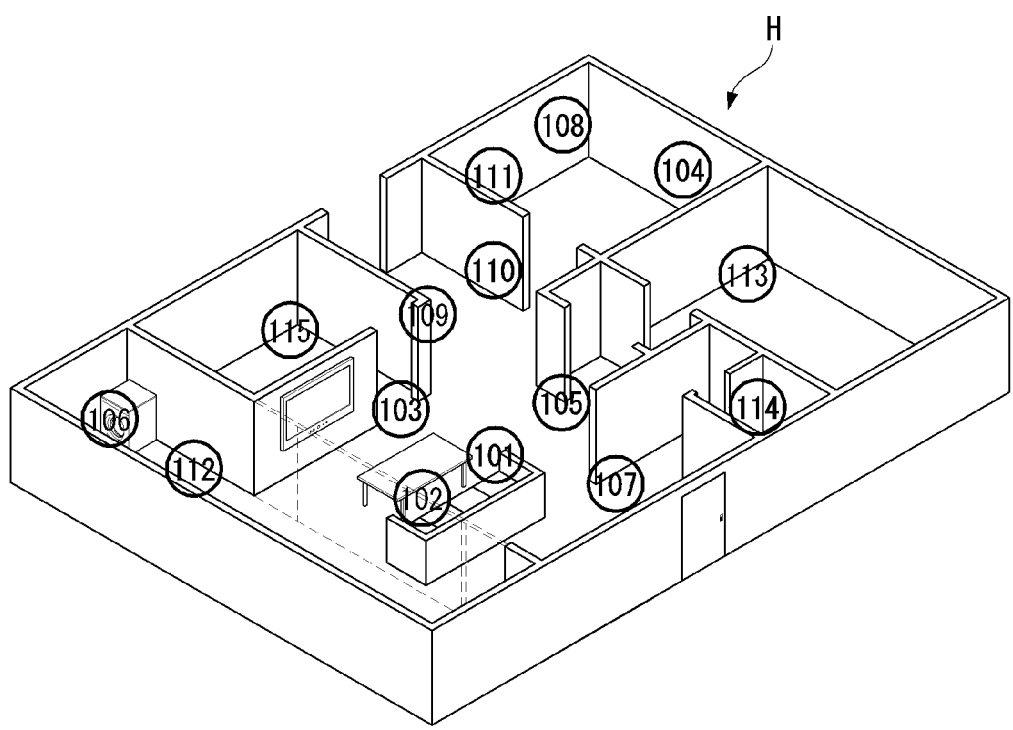
FIGS. 12 to 15 are diagrams showing various scenarios that a voice recognition system according to another embodiment of the present disclosure controls a plurality of voice recognition devices.

Referring to FIG. 12, it may be confirmed that various voice recognition devices are distributed in the home H. The voice recognition devices distributed in the home H may be, for example, a TV 101, an air conditioner 102, an air cleaner 103, a refrigerator 104, a cleaning robot 105, a washing machine 106, a PC 107, a kimchi refrigerator 108, a water purifier 109, a dishwasher 110, a microwave oven 111, a dryer 112, a styler 113, a massage chair 114 and a projector 115.

In the following, as shown in FIG. 12, the TV 101, the air conditioner 102, the air cleaner 103, the refrigerator 104, the cleaning robot 105, the washing machine 106, the PC 107, the kimchi refrigerator 108, the water purifier 109, the dishwasher 110, the microwave oven 111, the dryer 112, the styler 113, the massage chair 114, and the projector 115 are distributed and disposed in the home H, and it is assumed that each device has a voice recognition function. In addition, it is assumed that a second to a fourth users u2, u3, and u4 reside in the home H, and user information of the second to fourth users u2, u3, and u4 is stored in the voice recognition system. In addition, it is assumed that the second user u2 is a child, and the third and the fourth users u3 and u4 are adults and guardians of the second user u2.

Figure 13:
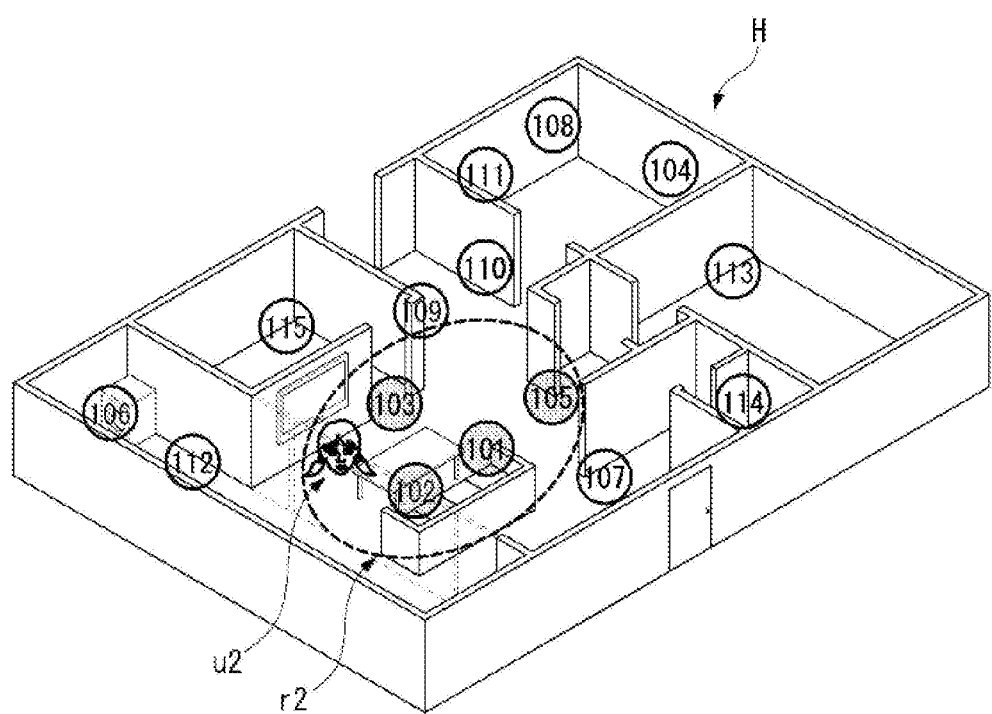

Referring to FIG. 13, the second user u2 may utter the voice "Turn on the power" in the living room r2 at 4.30 p.m. on weekdays. In this case, it is assumed that the second user u2 uttered "Turn on the power" to turn on the TV 101. That is, in this case, the intention of the second user u2 to utter "Turn on the power" is to turn on the power of the TV 101.

On the other hand, the voice recognition device for recognizing the voice uttered by the second user u2 may be the TV 101, the air conditioner 102, the air cleaner 103, and the cleaning robot 105.

In this case, in the related art, the voice recognition devices recognized the voice uttered by the second user u2 based on signal-to-noise ratio (SNR), and so that the TV 101 that the second user u2 wants to use is not operated, but the air cleaner 103 closest to the second user u2 may be turned on.

In addition, in the related art, in this case, since the TV 101, the air conditioner 102, the air cleaner 103, and the cleaning robot 105 are all in a wake up state, and maintain a waiting state until the next command that each device can process is received, devices that are not devices that the second user u2 wants to use operate and wait unnecessarily.

However, the voice recognition system according to the present embodiment analyzes the intention of the second user u2 through the voice uttered by the second user u2 using the model storage unit 360.

In particular, the model storage unit 360 may recognize that the time point at which the second user u2 utters the voice is '4.30 p.m. on weekdays', and recognize that the place where the second user u2 utters the voice is 'the living room r2'. In addition, the user identification unit 310 may recognize that user information or setting values of the second user u2 are stored in advance on the system, and may allow the model storage unit 360 to select the voice recognition device by loading the setting information or setting value of the second user u2.

For example, the user identification unit 310 may confirm that user information or setting values of the second user u2 are stored in advance in the voice recognition system, and grasp in advance that the second user u2 turns on the TV 101 at '4:30 on weekdays' and sets the channel to 'EBS', watches 'Ding Dong Daeng Kindergarten', which airs on '4.30 p.m. on weekdays'.

In addition, the model storage unit 360 may continuously learn that the second user u2 turns on the TV 101 at '4.30 p.m. on weekdays' and sets the channel to 'EBS', watches 'Ding Dong Daeng Kindergarten', which airs on '4.30 p.m. on weekdays'. Then, when the second user u2 utters "turn on the power" in the 'living room r2' on '4.30 p.m. on weekdays', the model storage unit 360 may turn on the TV 101 according to the learning result and set the channel to 'EBS'.

In this process, when the second user u2 utters "turn on the power" in 'the living room r2' at '4.30 p.m. on weekdays', the voice recognition system according to the present embodiment may analyze the intention and life pattern of the second user u2 to turn on the TV 101 and respond with "I will play the EBS channel".

That is, the voice recognition system according to the present embodiment determines which voice recognition device the second user u2 wants to use by using the model storage unit 360 and the user identification unit 310, and determines that the voice recognition device c1 that the second user u2 wants to use in the 'living room r2' at '4.30 p.m. on weekdays' is the TV 101 by considering the life pattern and usage pattern of the second user u2. In addition, it may turn on the TV 101 power in response to the voice of the second user u2 and set the channel to a channel that the second user u2 frequently watches at the corresponding time.

On the other hand, another scenario will be described with reference to FIG. 13. In another scenario, it will be handled a process of confirming whether the voice recognition system according to the present embodiment correctly controls a voice recognition device intended for use by the user.

For example, it is assumed that the second user u2 uttered "turn on" in 'living room r2' at '4.30 p.m. on weekends'. In addition, it is assumed that the voice recognition system according to the present embodiment, as described above, first learned that the second user u2 turns on the TV 101 in 'living room r2' at '4.30 p.m. on weekdays' and selects 'EBS' channel to watch 'Ding Dong Daeng Kindergarten'.

In this case, when the second user u2 utters "turn on the power" in the 'living room r2' at '4.30 p.m. on weekends', the voice recognition system according to the present embodiment may analyze the intention of the second user u2 using the model storage unit 360 and the user identification unit 310.

In addition, even though it is 'weekend', the voice recognition system according to the present embodiment may respond with "I will turn on the EBS channel" while turning on the TV 101 based on previous learning results and device selection results.

At this time, the second user u2 may express positive feedback, for example, "good job", "good" feedback. In this case, the voice recognition system according to the present embodiment analyzes the feedback of the second user u2 using the user feedback analysis unit 370. Then, through the feedback of the second user u2, it is checked whether the voice recognition system appropriately selects a voice recognition device that the second user u2 wants to use. At this time, since the second user u2 expressed positive feedback such as "good job" and "good", the user feedback analysis unit 370 analyzes that there was positive feedback, including the case where the feedback of the second user u2 is silent (case where there is no other voice). Then, by performing artificial intelligence learning on this feedback analysis process, next, when the second user u2 utters "turn on the power" at '4.30 p.m. on weekends' in the living room r2, it may be used to select a voice recognition device to operate.

On the other hand, when the second user u2 shows neutral feedback, for example, if it shows neutral feedback, such as "Turn on KBS," the user feedback analysis unit 370 may analyze this neutral feedback and determine that the voice recognition device to which the voice recognition system will operate is properly selected. However, the user feedback analysis unit 370 determines that the voice recognition system has failed to predict the channel that the second user u2 will watch through the TV 101.

Accordingly, in the case of such neutral feedback, the user feedback analysis unit 370 determines whether the voice recognition device corresponding to the intention of the second user u2 is properly selected and whether the selected voice recognition device executes a function corresponding to the intention of the second user u2.

In addition, when the second user u2 shows negative feedback, for example, if the negative feedback of "turn on the air conditioner instead of the TV" is showed, the user feedback analysis unit 370 may analyze this negative feedback and determine that the voice recognition device to which the voice recognition system will operate has not been properly selected. In addition, the user feedback analysis unit 370 may determine that the voice recognition system has not properly controlled the air conditioner 102.

When such negative feedback occurs, the user feedback analysis unit 370 performs artificial intelligence learning on the results of the feedback analysis, and reflects the learned results to the model storage unit 360, and changes the model structure of the device selection model 362 and the user intention analysis model 361, or adds or modifies the life pattern of the user and the device usage pattern of the user.

At this time, with reference to FIG. 14, another scenario for controlling the operation of the voice recognition device using the voice recognition system according to the present embodiment will be described.

Figure 14:
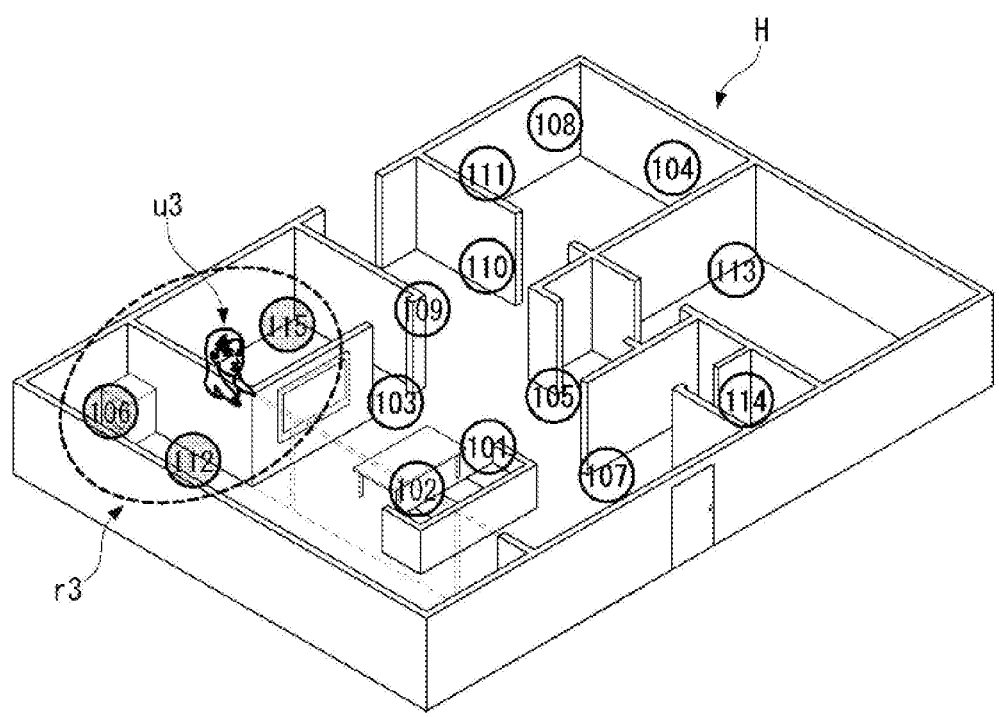

Referring to FIG. 14, a third user u3 may utter a voice of "turn on the power" in the multi-purpose room r3 at 9 a.m. on weekdays. In this case, it is assumed that the third user u3 uttered "turn on the power" to turn on the power of the washing machine 106. That is, in this case, intention of the third user u3 to utter "turn on the power" is to turn on the power of the washing machine 106.

On the other hand, the voice recognition device for recognizing the voice uttered by the third user u3 may be the washing machine 106, the dryer 112, and the projector 115.

The voice recognition system according to the present embodiment analyzes the voice of the third user u3 recognized by the washing machine 106, the dryer 112, and the projector 115 using the model storage unit 360, and analyzes the intention of the third user u3 to select a voice recognition device that the third user u3 wants to use.

In particular, the model storage unit 360 may recognize that a point in time when the third user u3 utters the voice is '9 a.m. on weekdays', and may recognize that a place where the third user u3 utters the voice is the 'multi-purpose room r3'. In addition, the user identification unit 310 may recognize that user information or setting values of the third user u3 are stored in advance on the system, and load the setting information or setting value of the third user u3 so that the model storage unit 360 may select the voice recognition device.

For example, the user identification unit 310 may confirm that the user information or the setting values of the third user u3 are stored in advance in the voice recognition system, and grasp in advance that the third user u3 turns on the washing machine 106 at '9 a.m. on weekdays' and sets the washing mode to 'standard'.

In addition, the model storage unit 360 may learn that the third user u3 turns on the washing machine 106 at '9 a.m. on weekdays' and sets the washing mode to 'standard'. Then, when the third user u3 utters "turn on the power" in the 'multi-purpose room r3' at '9 a.m. on weekdays', the model storage unit 360 may turn on the washing machine 106 and set the washing mode to 'standard' according to the learning result.

In this process, when the third user u3 utters "turn on the power" in 'multi-purpose room r3' at '9 a.m. on weekdays', the voice recognition system according to the present embodiment may analyze the intention and life pattern of the third user u3 and turns on the power of the washing machine 106, and cause the washing machine 106 to perform a response "Please tell me the desired washing course or option". In addition, unlike this, the washing machine 106 may be controlled to perform a response, "Do you want to start washing with the stored laundry course?".

That is, the voice recognition system according to the present embodiment grasps which voice recognition device the third user u3 wants to use using the model storage unit 360 and the user identification unit 310, and determines that the voice recognition device that the third user u3 wants to use in the 'multi-purpose room r3' at '9 a.m. on weekdays' is the washing machine 106 considering the life pattern and usage pattern of the third user u3. In addition, the voice recognition system may turn on the power of the washing machine 106 in response to the voice of the third user u3 and execute a response "Please tell me the desired washing course or option.", or execute a response, "Would you like to start washing with the stored laundry course?", or set the washing mode to the washing mode previously performed.

In addition, in this scenario, it goes through a process of confirming whether the voice recognition system according to the present embodiment correctly controls a voice recognition device intended for use by the user.

For example, it is assumed that the third user u3 uttered "turn on the power" in the 'multi-purpose room r3' at '9 a.m. on weekdays'. In addition, as described above, it is assumed that the voice recognition system according to the present embodiment has learned that the third user u3 turns on the washing machine 106 in the 'multi-purpose room r3' at '9 a.m. on weekdays' and sets the washing machine to the 'standard' washing mode.

In this case, when the third user u3 utters "turn on the power" in 'multi-purpose room r3' at '9.30 a.m. on weekends', the voice recognition system according to the present embodiment may analyze the intention of the third user u3 using the model storage unit 360 and the user identification unit 310.

Even though it is 'weekend' and '9.30 a.m.', the voice recognition system according to the present embodiment may determine that the third user u3 is likely to use the washing machine 106 based on previous learning results and device selection results, and may execute the response "Please tell me the desired laundry course or option" while turning on the washing machine 106 or "Would you like to start washing with the stored laundry course?" through the washing machine 106.

At this time, the third user u3 may express positive feedback, for example, "standard mode", "like" feedback. In this case, the voice recognition system according to the present embodiment analyzes the feedback of the third user u3 using the user feedback analysis unit 370. In addition, the voice recognition system according to the present embodiment checks whether the voice recognition system appropriately selects a voice recognition device that the third user u3 wants to use through the feedback of the third user u3. At this time, since the third user u3 expressed positive feedback such as "standard mode" and "like", the user feedback analysis unit 370 analyzes that there was positive feedback including the case where the feedback of the third user u3 is silent (the case where there is no other voice). Then, by performing artificial intelligence learning on this feedback analysis process, next, when the third user u2 utters "turn on the power" at '9.30 a.m. on weekends' in the multi-purpose room r3, it may be used to select a voice recognition device to operate.

On the other hand, when the third user u3 shows neutral feedback, for example, if it shows neutral feedback, such as "Please set the functional clothing washing mode," the user feedback analysis unit 370 may analyze this neutral feedback and determine that the voice recognition device to which the voice recognition system will operate is properly selected. However, the user feedback analysis unit 370 determines that the voice recognition system has failed to set the washing machine 106 to the washing mode desired by the third user u3.

Accordingly, in the case of such neutral feedback, the user feedback analysis unit 370 determines whether the voice recognition device corresponding to the intention of the third user u3 is properly selected and whether the selected voice recognition device executes a function corresponding to the intention of the third user u3.

In addition, when the third user u3 shows negative feedback, for example, if the negative feedback of "turn on the dryer instead of the washing machine" is showed, the user feedback analysis unit 370 may analyze this negative feedback and determine that the voice recognition device to which the voice recognition system will operate has not been properly selected. In addition, the user feedback analysis unit 370 may determine that the voice recognition system has not properly controlled the dryer 112.

When such negative feedback occurs, the user feedback analysis unit 370 performs artificial intelligence learning on the results of the feedback analysis, and reflects the learned results to the model storage unit 360, and changes the model structure of the device selection model 362 and the user intention analysis model 361, or adds or modifies the life pattern of the user and the device usage pattern of the user.

Another example about that the voice recognition system according to the present embodiment through FIG. 14 recognizes a user's voice and controls the voice recognition device that the user intends to use is as follows.

First, it is assumed that the third user u3 uttered "turn on the power" in the 'multi-purpose room r3' at '9 a.m. on every Tuesday'. In addition, it is assumed that the voice recognition system according to the present embodiment sufficiently learns in advance the life pattern and device usage pattern of the third user u3, and learns that third user u3 turns on the washing machine 106 and sets the washing machine to the 'standard' washing mode in 'the multi-purpose room r3' at '9 a.m. on every Tuesday' from 'April to October, which is spring, summer, and autumn'.

In this case, if the third user u3 utters "turn on the power" in the 'multi-purpose room r3' at '9.30 a.m. on Tuesday' in 'December corresponding to winter', the voice recognition system according to the present embodiment may analyze the intention of "turn on the power" uttered by the third user u3 based on the intention and life pattern of the third user u3 previously learned.

In addition, considering that the life pattern of the third user u3 is using the washing machine 106 at '9 a.m. on Tuesday', the voice recognition system according to the present embodiment may determine that the third user u3 is likely to use the washing machine 106 at '9.30 a.m.', which does not show a large time interval difference from '9 a.m.'. In addition, the voice recognition system may determine that the intention of "turn on the power" is to turn on the washing machine 106.

At this time, the voice recognition system may execute the response "Please tell me the desired washing course or option" or "Would you like to start washing with the stored laundry course?" through the washing machine 106 while turning on the washing machine 106.

In addition, the voice recognition system according to the present embodiment may predict in advance that after the third user u3 washes using the washing machine 106, the dryer 112 is not used in 'from April to October corresponding to spring, summer, and autumn', but after the third user u3 washes using the washing machine 106, the dryer 112 will be used in 'December corresponding to winter'.

Since the voice recognition system according to the present embodiment continuously performs artificial intelligence learning on the life pattern, user information, or setting value of the third user u3, and the operating history and operating environment of the voice recognition device, when the third user u3 wants to use the washing machine 106 in the winter, the voice recognition system according to the present embodiment may predict that there is a possibility of additionally using the dryer 112.

Therefore, the voice recognition system according to the present embodiment may perform a response, "Please tell me the desired washing course or option." to the third user u3 through the washing machine 106, and may turn on the power of the dryer 112 and simultaneously perform a response "Would you like to start drying the laundry in the set drying mode?" when the washing of the washing machine 106 is finished.

In addition, the voice recognition system according to the present embodiment may perform a response, "turn on the dryer and switch to standby mode." through the dryer 112, while turning on the power of the dryer 112, when the washing machine 106 performs the above-described response.

In addition, the voice recognition system according to the present embodiment collects and analyzes feedback expressed by the third user u3, and checks whether prediction that the third user u3 using the washing machine 106 will additionally use the dryer 112 in the 'winter season' is appropriate.

If the third user u3 expresses positive feedback, for example, "like" feedback, the voice recognition system according to the present embodiment analyzes the feedback of the third user u3 using the user feedback analysis unit 370. Then, through the feedback of the third user u3, it is checked whether the voice recognition system has correctly identified the intention that the third user u3 wants to use the dryer 112 after using the washing machine 106. At this time, since the third user u3 expressed positive feedback such as "like", the user feedback analysis unit 370 analyzes that there was positive feedback, including the case where the feedback of the third user u3 is silent (case where there is no other voice). Then, by performing artificial intelligence learning on this feedback analysis process, next, when the third user u2 utters "turn on the power" at '9.30 a.m. on weekends in the winter (December to February)' in the multi-purpose room r3, it may be constructed a model predicting that after using the washing machine 106, the dryer 112 can be operated.

At this time, referring to FIG. 15, another scenario for controlling the operation of the voice recognition device using the voice recognition system according to the present embodiment will be described.

Figure 15:
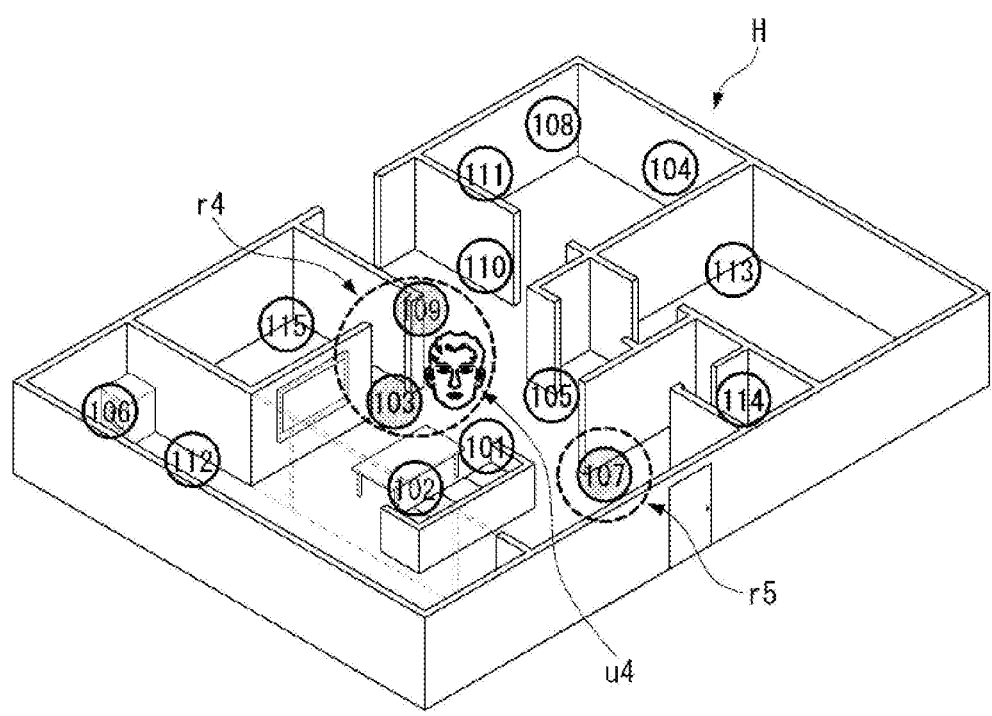

Referring to FIG. 15, the fourth user u4 may utter a voice "turn on the power" in the 'front door r4' at '8 p.m. on weekdays'. In this case, it is assumed that the fourth user u4 has uttered "turn on the power" to turn on the power of the PC 107. That is, in this case, intention of the fourth user u4 to utter "turn on the power" is to turn on the power of the PC 107.

In this case, the voice recognition device for recognizing the voice uttered by the fourth user u4 may be an air cleaner 103 and a water purifier 109. The voice recognition system according to the present embodiment analyzes the voice of the fourth user u4 recognized by the air cleaner 103 and the water purifier 109 using the model storage unit 360, and analyzes the intention of the fourth user u4 to select a voice recognition device that fourth user u4 wants to use.

In particular, the model storage unit 360 may recognize that a point in time when the fourth user u4 utters the voice is '8 p.m. on weekdays', and may recognize that a place where the fourth user u4 utters the voice is the 'front door r4'. In addition, the user identification unit 310 may recognize that user information or setting values of the fourth user u4 are stored in advance on the system, and load the user information or setting value of the fourth user u4 so that the model storage unit 360 may select the voice recognition device.

For example, the user identification unit 310 may confirm that the user information or the setting values of the fourth user u4 are stored in advance in the voice recognition system. At this time, the user information or setting value of the fourth user u4 may be information about the life pattern of the fourth user u4 and the usage pattern of the voice recognition device of the fourth user u4 that the fourth user u4 turns on the power of the PC 107 at '8 p.m. to 9 p.m. on weekdays'. Therefore, the voice recognition system according to the present embodiment may recognize through the user identification unit 310 that the user who uttered the voice "turn on power" in the 'front door r4' is the fourth user u4. In addition, the voice recognition system may grasp in advance through the user information or setting values stored in the user identification unit 310 that the fourth user u4 turns on the power of the PC 107 at '8 p.m. to 9 p.m. on weekdays'.

On the other hand, the model storage unit 360 may perform the artificial intelligence learning on that the fourth user u4 turns on the power of the PC 107 at '8 p.m. to 9 p.m. on weekdays'. In addition, when the fourth user u4 utters "turn on the power" in the 'front door r4' at '8 p.m. on weekdays', the model storage unit 360 may turn on the power of the PC 107 according to the learning result. In this case, the PC 107 did not directly recognize the voice of the fourth user u4, but the air cleaner 103 and the water purifier 109 disposed close to the 'front door r4' recognize the voice of the fourth user u4, and the voice recognition system may analyze the voice of the fourth user u4 recognized by the air cleaner 103 and the water purifier 109, and determine that the fourth user u4 will use the PC 107 based on the life pattern and intention of the fourth user u4. The voice recognition system may control the operation of the PC 107 with the determination result.

In this process, when the fourth user u4 utters "turn on the power" in the "front door r4' at '8 p.m. on weekdays', the voice recognition system according to the present embodiment may turn on the power of the PC 107 and, at the same time, cause the PC 107 to perform a response of "Please select a program to be executed." by analyzing the intention and life pattern of the fourth user u4. In addition, since the PC 107 is disposed in a study room r5, which is far from the front door r4, when the PC 107 responds with "Please select a program to be executed.", the fourth user u4 located at the front door r4 may not recognize the response content. Therefore, in this case, the voice recognition system according to the present embodiment may perform a response of "Please select a program to be executed." through the air cleaner 103 and the water purifier 109 that directly recognize the voice of the fourth user u4

In addition, the voice recognition system according to the present embodiment collects and analyzes feedback expressed by the fourth user u4, and checks and learns whether the prediction that the fourth user u4 will use the PC 107 at the corresponding time is appropriate.

If a user who wants to use the voice recognition device at home (H) is a user whose user information or setting values are not stored in the voice recognition system, the voice recognition system classifies this user as a common user, regardless of existing user information or setting values, analyzes intention of the common user, identifies life pattern, and selects a voice recognition device to be used by the common user.

That is, for example, when a fifth user other than the second to fourth users illustrated in FIGS. 12 to 15 wants to watch the TV 101 at home H, the fifth user may utter the voice "turn on the power" in the living room r2. In this case, the voice recognition system determines whether the user information or setting value of the fifth user is stored or registered in the voice recognition system through the user recognition unit 310. However, since the user information or setting values of the fifth user are not stored in the voice recognition system, the voice recognition system must grasp the intention of the fifth user's utterance without recommending information on the history of the voice recognition device previously used by the fifth user or the place or time at which the voice recognition device was used by the fifth user.

In this case, the voice recognition system may perform a response, "Please tell me the device you want to operate." using any one of the voice recognition devices 101, 102, 103, 105 disposed in the living room r2.

Then, when the fifth user answers "I want to watch TV" or "TV", the voice recognition system may control the TV 101 to be turned on.

Hereinafter, with reference to FIGS. 16 and 17, a method for controlling a plurality of voice recognition devices using a voice recognition system according to another embodiment of the present disclosure will be described. In describing the method for controlling the plurality of voice recognition devices according to the present embodiment, the same configuration as the above-described voice recognition system may be described using the same reference numerals, and to avoid overlapping descriptions, some descriptions may be omitted.

Figure 16:
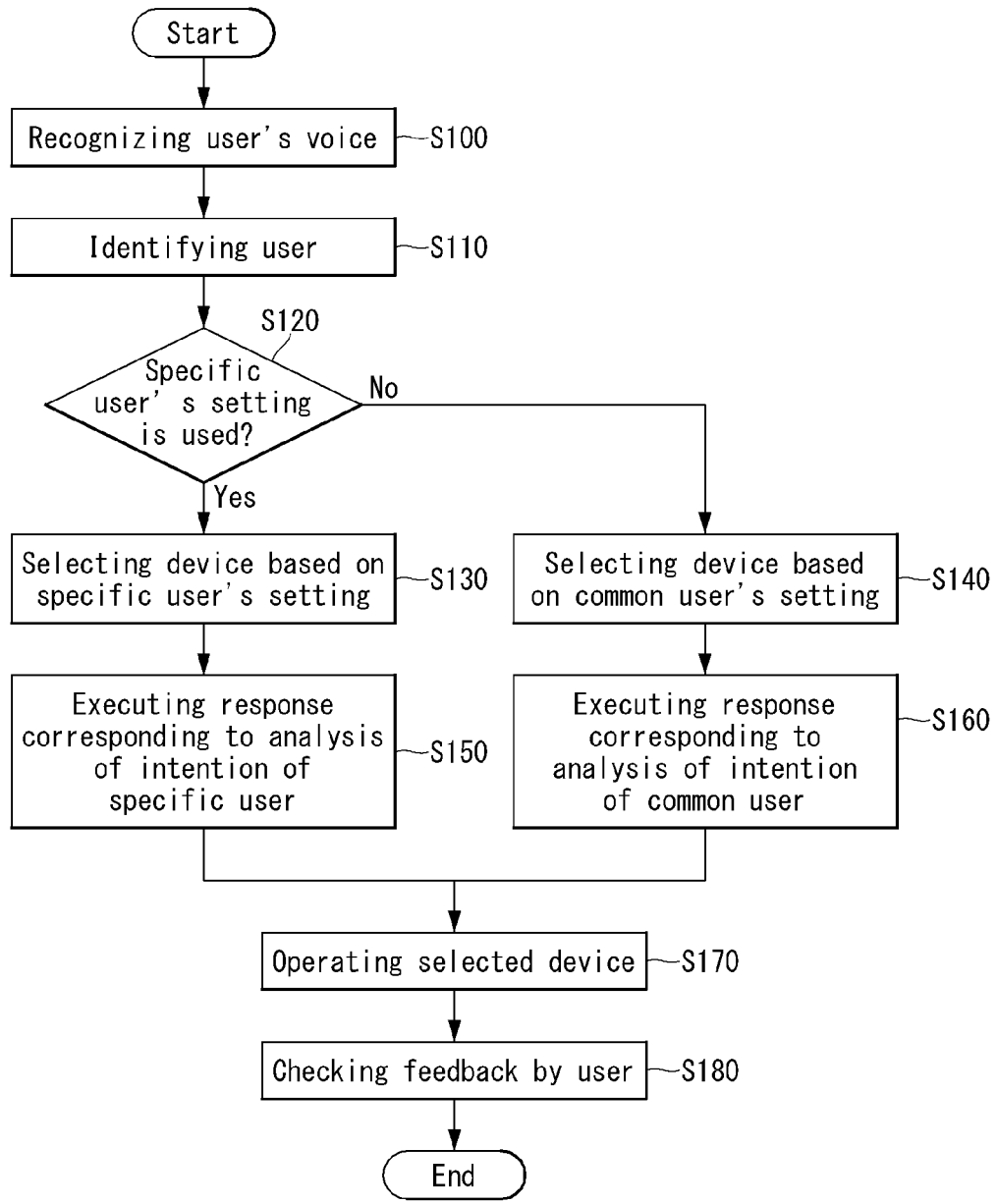
FIG. 16 is a flowchart illustrating a method for controlling a plurality of voice recognition devices using a voice recognition system according to the present disclosure.

FIG. 16 is a flowchart illustrating a method for controlling a plurality of voice recognition devices using a voice recognition system according to the present disclosure.

First, the voice recognition system starts in a waiting state in which a plurality of voice recognition devices 102, 103,

104, 105, 106, and 115 disposed in a certain area, such as the home H shown in FIG. 12, may recognize a user's voice at the home H.

When the user at the home H utters a voice, the voice recognition devices 102, 103, 104, 105, 106 ... 115 disposed close to the user recognize the user's voice (S100).

The user's voice recognized through each voice recognition device is transmitted to the server 300 or the control device 310 constituting the voice recognition system, and the server 300 or the control device 310 analyzes the transmitted voice to identify who the user is (S110). Hereinafter, for convenience of description, it will be described as an example that the server 300 equipped with the AI processor 31 analyzes a user's voice and serves to control each voice recognition device.

On the other hand, the server 300 identifies who the user who uttered the voice is through the user identification unit 310, and checks whether the setting value for the user is stored in the user identification unit 310 (S110). If it is confirmed that the user information or setting values of the user are stored in the user identification unit 310, the server 300 determines that the user registered in the system has uttered a voice command, and determines to apply the corresponding setting value of the user who uttered the voice command to the voice recognition device selection (S120). Here, since a specific user, which is a user registered in the system, selects a voice recognition device to be used, this device becomes the first voice recognition device.

However, if the user information or setting values of the user are not stored in the user identification unit 310, the server 300 determines that the common user has uttered the voice command, and selects a voice recognition device to be used by a common user without applying a setting value of the user (S120). In this case, the voice recognition device to be used by the common user may be any one of the first voice recognition devices, but may be the second voice recognition device that is another voice recognition device, not the first voice recognition device stored in a specific user's setting value.

On the other hand, if the server 300 determines that a specific user registered in the system has uttered a voice command, the server 300 selects the first voice recognition device based on a pre-stored setting value or life pattern of the specific user (S130). However, if the server 300 determines that a common user who is not registered in the system has uttered a voice command, the server 300 selects a voice recognition device that a common user wants to use without applying the pre-stored setting value (S140).

Steps S130 and S140 analyze the user's voice to determine what the user's intention is. Then, a response corresponding to the intention of the specific user may be performed through the first voice recognition device (S150). In addition, a response corresponding to the intention of the common user may be performed through the voice recognition device that the common user wants to use (S160).

After the voice recognition device performs the response, the server 300 controls the voice recognition device that the user wants to use, and allows a function corresponding to the user's voice to be executed by the voice recognition device (S170).

Thereafter, the server 300 collects, checks, and analyzes feedback expressed by the user through a voice recognition device being used by the user or voice recognition devices disposed around the user (S180). Then, the server 300 analyzes the feedback of the user, and checks whether the server 300 appropriately selects a voice recognition device corresponding to the user's intention, and performs artificial intelligence learning. The result that the server 300 performs the artificial intelligence learning on the feedback of the user is applied to the device selection model and the user intention analysis model to change or modify the model.

Figure 17:
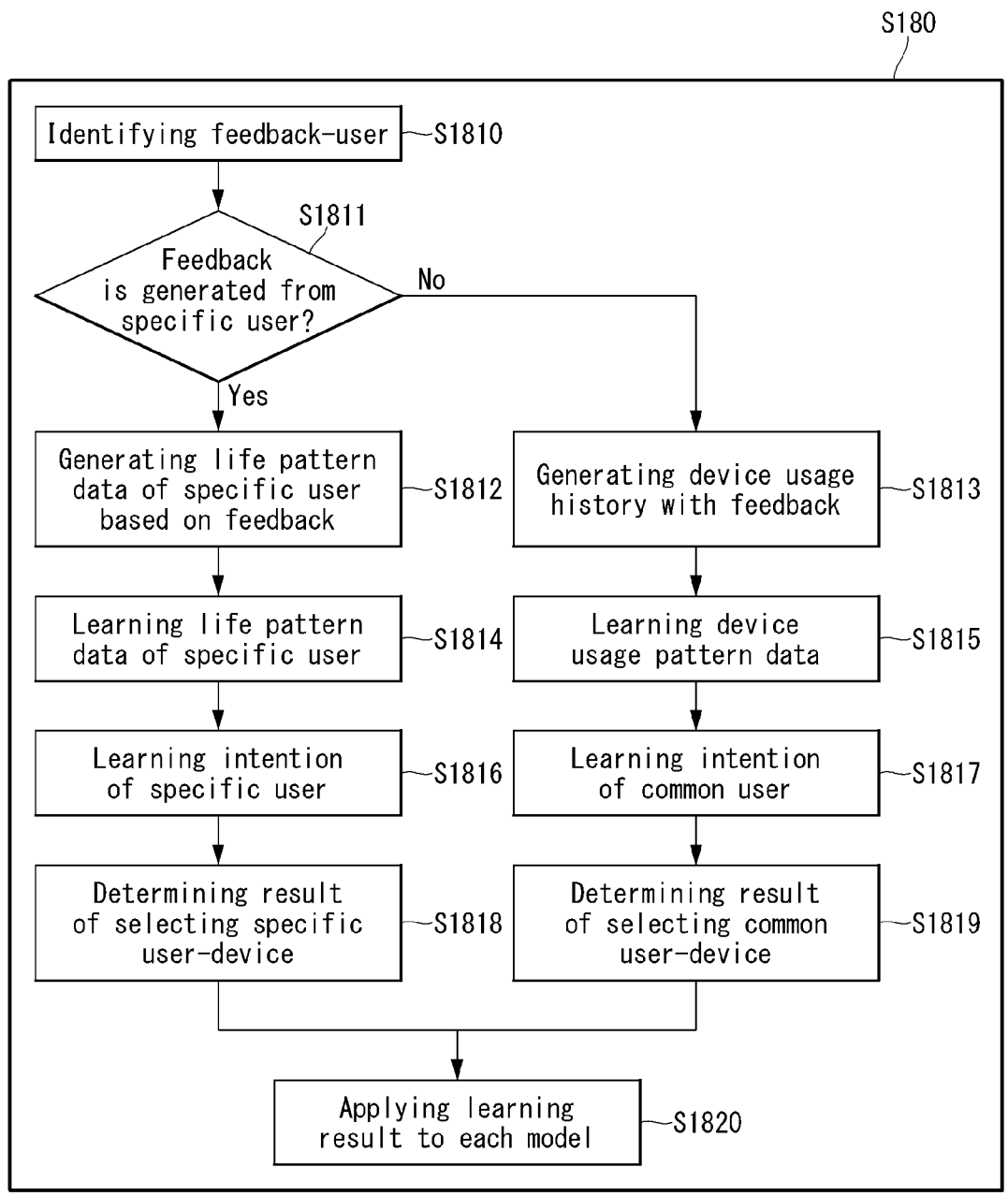
FIG. 17 is a flowchart illustrating a process of analyzing feedback expressed by a user by a voice recognition system according to the present disclosure.

On the other hand, referring to FIG. 17, it may be confirmed how the voice recognition system analyzes the feedback expressed by the user. FIG. 17 is a flowchart illustrating a process of analyzing feedback expressed by a user by a voice recognition system according to the present disclosure.

Referring to FIG. 17, step S180 includes a process of confirming from which user the feedback is generated (S1810). That is, when the specific user whose user information or setting value is registered or stored in the system uses the voice recognition device, the server 300 separates the feedback generated from the specific user from the feedback from the common user and processes and analyzes the feedback. This is to establish a device usage pattern and a life pattern for the specific user, and to predict the use of a voice recognition device of the specific user by managing and storing the feedback of the specific user separately.

On the other hand, when the server 300 confirms that the feedback is generated from the specific user, the server 300 classifies the feedback generated from the specific user from other feedbacks (S1811), and generates life pattern data of the specific user based on the feedback (S1812).

In addition, the server 300 may update data or information about the life pattern for the specific user by performing artificial intelligence learning on the life pattern data of the specific user generated based on the feedback (S1814).

However, even if the specific user has user information or setting vales stored in the system, when such a specific user first uses the voice recognition system according to the present disclosure, initially, since there is no data related to the user information and setting values of the specific user, it is possible to store only feedback generated from the specific user without generating a life pattern for the specific user until data related to the user information and setting values of the specific user is accumulated.

Thereafter, the server 300 performs artificial intelligence learning on the intention of the use by comparing and analyzing the feedback generated from the specific user and the voice uttered by the specific user (S1816). That is, this process is that the server 300 compare and analyze whether a specific user's intention A as a result of analyzing a specific user's voice is identical or similar to a specific user's intention B as a result of analyzing the feedback of a specific user in step S130.

Thereafter, the server 300 determines whether or not the specific user has executed a desired function by appropriately controlling the voice recognition device that the specific user wants to use according to the learning result of step S1816 (S1818).

For example, as shown in FIG. 14, it is assumed that the third user u3 utters "turn on the power" in order to use the washing machine 106 in the multi-purpose room r3 at '9.30 a.m. on weekends', and the voice recognition system controls the washing machine 106 to be set to wash the laundry in the "standard mode". At this time, the third user u3 may express positive feedback such as "like".

In this case, the voice recognition system according to the present embodiment confirms that the corresponding feedback is generated from the third user u3 using the user feedback analysis unit 370 (S1810). The user feedback analysis unit 370 classifies, manages and stores positive feedback generated from the third user u3 (S1811), and generates life pattern data of the third user u3 based on the feedback (S1812).

Thereafter, the server 300 may update data or information on the life pattern of the third user u3 that is stored in the system by performing artificial intelligence learning on the life pattern data of the third user u3 through the user feedback analysis unit 370 (S1814).

In addition, the server 300 analyzes the intention of feedback "like" generated from the third user u3 through the user feedback analysis unit 370 (S1816).

Then, the server 300 compares the result of analyzing the intention of "turn on the power", which is the utterance of the third user u3 by the specific user intention analysis model 3611 with the result of analyzing the intention of feedback "like" generated from the third user u3 by the user feedback analysis unit 370 (S1818). The server 300 determines whether washing has been performed by properly controlling the washing machine 106 that the third user u3 wanted to use according to the comparison result of step S1818 (S1818).

Then, the server 300 may update the user intention analysis model 361 and the device selection model 362 using the determination result of step S1818 (S1820).

For example, as in the above example, when the server 300 controls the washing machine 106 by accurately analyzing the intention of the third user u3, the determination result of step S1818 may be a positive result. In this case, in the case of the same or similar to the above-described example, the server 300 may update the models by assigning weights to the model so that the user intention analysis model 361 and the device selection model 362 select the washing machine 106 (S1820).

However, when the server 300 does not accurately analyze the intention of the third user u3 to control the dryer 112, the determination result of step S1818 may be a negative result, when the same or similar case to the above example occurs, the server 300 may update the models by assigning weights to the models so that the user intention analysis model 361 and the device selection model 362 do not select the dryer 112 (S1820).

On the other hand, in step S1810, if the server 300 confirms that the feedback is generated from the common user, not the specific user, in step S1811, the server 300 does not separately classify the feedback generated from the common user. The server 300 generates usage history of each voice recognition device using all of the feedbacks generated by the plurality of common users (S1813).

Then, in step S1813, the server 300 generates a pattern in which common users use the voice recognition device and performs artificial intelligence learning on this based on the usage history of each voice recognition device (S1815).

In addition, the server 300 may perform artificial intelligence learning on the intention of many and unspecified common users to use each voice recognition device based on the pattern using the voice recognition device (S1817).

Thereafter, the server 300 may determine whether a function desired by the common user is executed through the corresponding voice recognition device by properly controlling the voice recognition device that the common user wanted to use (S1819), and update the user intention analysis model 361 and the device selection model 362 according to the determination result in step S1819 (S1820).

As described above, since the device, the system and the control method for controlling the plurality of voice recognition devices according to the present disclosure determine the voice recognition device that the user wants to use by analyzing and determining the user's voice utterance time, place, and user's life pattern by themselves, the user can use the voice recognition device that the user wants to use with a simple command, and the user's UX environment is improved.

In addition, since the device, the system and the control method for controlling the plurality of voice recognition devices according to the present disclosure determine the voice recognition device that the user wants to use by analyzing and determining the user's voice utterance time, place, and user's life pattern by themselves, the voice recognition device may perform a function in advance by predicting a function desired by the user.

The present disclosure can be implemented as a computer-readable code on a medium on which a program is recorded. The computer readable medium includes all kinds of recording devices in which data that can be read by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like, or be implemented in the form of a carrier wave (e.g., transmission over the internet). Accordingly, the above detailed description should not be construed in all aspects as limiting, and be considered illustrative. The scope of the present disclosure should be determined by rational interpretation of the appended claims, and all changes within the equivalent range of the present disclosure are included in the scope of the present disclosure.

What is claimed is:

1. A device for controlling a plurality of voice recognition devices, the device comprising:
    a user identification unit configured to identify a user based on a voice spoken by the user at a specific time of day;
    a user setting storage unit configured to store usage pattern information of the user including information on a particular function to be performed at a particular location at a particular time of day using a first voice recognition device; and
    a processor configured to:
        recognize speech of the user based on the voice spoken by the user;
        determine a correspondence between the recognized speech of the user, a location where the voice was received, and the specific time of day of the voice spoken by the user with the stored usage pattern information of the user;
        select the first voice recognition device based on the stored usage pattern information indicating that the first voice recognition device is associated with the recognized speech of the user, the location where the voice was received, and the specific time of day of the voice spoken by the user; and
        cause the first voice recognition device to execute the particular function in response to the voice spoken by the user.

2. The device of claim 1, wherein the model storage unit further includes:
    an intention analysis model configured to analyze the intention; and
    a device selection model configured to select the first voice recognition device,
    wherein the first voice recognition device is a voice recognition device that the user wants to use among a plurality of voice recognition devices.

3. The device of claim 2, wherein the intention analysis model includes:
- a specific user intention analysis model configured to analyze intention of a specific user, wherein the specific user is defined as a user whose usage pattern information is stored in the user setting storage unit; and
- a common user intention analysis model configured to analyze individual intention of a common user, wherein the common user is defined as a user different from the specific user and whose usage pattern information is not stored in the user setting storage unit.

4. The device of claim 3, wherein the device selection model includes:
- a specific user device selection model configured to select the first voice recognition device among the plurality of voice recognition devices in response to the intention of the specific user; and
- a common user device selection model configured to select a voice recognition device corresponding to the individual intention of the common user among the plurality of voice recognition devices,
- wherein the voice recognition device corresponding to the individual intention of the common user includes at least one of the first voice recognition device and a second voice recognition device that is a device different from the first voice recognition device.

5. The device of claim 1, further comprising:
- a user feedback analysis unit configured to collect and analyze a reaction of the user,
- wherein the user feedback analysis unit is configured to compare the intention with the reaction of the user, and determine whether the device that the user wanted to use matches the first voice recognition device.

6. A system for controlling a plurality of voice recognition devices, the system comprising:
- a plurality of voice recognition devices;
- a server networked with each of the plurality of voice recognition devices; and
- a user terminal configured to perform data communication with the server and the voice recognition devices,
- wherein the server includes:
  - a user identification unit configured to identify a user based on a voice spoken by the user at a specific time of day;
  - a user setting storage unit configured to store usage pattern information of the user including information on a particular function to be performed at a particular location at a particular time of day using a first voice recognition device;
  - a processor configured to:
    - recognize speech of the user based on the voice spoken by the user;
    - determine a correspondence between the recognized speech of the user, a location where the voice was received, and the specific time of day of the voice spoken by the user with the stored usage pattern information of the user;
    - select the first voice recognition device based on the stored usage pattern information indicating that the first voice recognition device is associated with the recognized speech of the user, the location where the voice was received, and the specific time of day of the voice spoken by the user; and
    - cause the first voice recognition device to execute the particular function in response to the voice spoken by the user.

7. The system of claim 6, wherein the plurality of voice recognition devices includes at least a TV, an air conditioner, an air cleaner, a refrigerator, a kimchi refrigerator, a water purifier, a dishwasher, a microwave, a washing machine, a dryer, a styler, a cleaning robot, a massage chair, a PC, or a projector.

8. The system of claim 6, wherein the model storage unit further includes:
- an intention analysis model configured to analyze the intention; and
- a device selection model configured to select the first voice recognition device,
- wherein the first voice recognition device is a voice recognition device that the user wants to use among the plurality of voice recognition devices.

9. The system of claim 8, wherein the intention analysis model includes:
- a specific user intention analysis model configured to analyze intention of a specific user, wherein the specific user is defined as a user whose usage pattern information is stored in the user setting storage unit; and
- a common user intention analysis model configured to analyze individual intention of a common user, wherein the common user is defined as a user different from the specific user and whose usage pattern information is not stored in the user setting storage unit.

10. The system of claim 9, wherein the device selection model includes:
- a specific user device selection model configured to select the first voice recognition device among the plurality of voice recognition devices in response to the intention of the specific user; and
- a common user device selection model configured to select a voice recognition device corresponding to the individual intention of the common user among the plurality of voice recognition devices,
- wherein the voice recognition device corresponding to the individual intention of the common user includes at least one of the first voice recognition device and a second voice recognition device that is a device different from the first voice recognition device.

11. The system of claim 6, wherein the server further includes a user feedback analysis unit configured to collect and analyze a reaction of the user, and
- wherein the user feedback analysis unit is configured to compare the intention with the reaction of the user, and determine whether the device that the user wanted to use matches the first voice recognition device.

12. A method for controlling a plurality of voice recognition devices, comprising:
- receiving a voice of a user at a specific time of day by the voice recognition devices;
- recognizing speech of the user and identifying the user based on the voice;
- determining a correspondence between the recognized speech of the user, a location where the voice was received, and the specific time of day of the voice spoken by the user with stored usage pattern information of the user stored by a user setting storage unit, wherein the usage pattern information of the user includes information on a particular function to be performed at a particular location at a particular time of day using a first voice recognition device;
- selecting the first voice recognition device among the plurality of voice recognition devices based on the stored usage pattern information indicating that the first voice recognition device is associated with the recognized speech of the user, the location where the voice was received, and the specific time of day of the voice spoken by the user; and causing the particular function to be executed by the first voice recognition device in response to the voice of the user.

13. The method of claim 12, further comprising:

receiving feedback from the user in response to execution of the function by the first voice recognition device;

determining whether selection of the first voice recognition device correctly corresponded to the intention of the specific user based on the feedback; and updating an intention analysis model and a device selection model depending on the determination.

\* \* \* \* \*